United States Patent [19]
Kubosawa

[11] Patent Number: 5,682,521
[45] Date of Patent: Oct. 28, 1997

[54] MICROPROCESSOR CONTROL SYSTEM WHICH SELECTS OPERATING INSTRUCTIONS AND OPERANDS IN AN ORDER BASED UPON THE NUMBER OF TRANSFERRED EXECUTABLE OPERATING INSTRUCTIONS

[75] Inventor: Hajime Kubosawa, Kawasaki, Japan

[73] Assignee: Fujitsu Limited, Kawasaki, Japan

[21] Appl. No.: 272,939

[22] Filed: Jul. 11, 1994

[30]  Foreign Application Priority Data

Sep. 20, 1993  [JP]  Japan ................... 5-233768

[51] Int. Cl.$^6$ .................................................. G06F 9/30
[52] U.S. Cl. ........................................ 395/376; 395/800
[58] Field of Search ............................. 395/375, 800

[56]  References Cited

U.S. PATENT DOCUMENTS

| | | | |
|---|---|---|---|
| 4,807,115 | 2/1989 | Torng | 395/375 |
| 5,404,470 | 4/1995 | Miyake | 395/375 |
| 5,497,499 | 3/1996 | Garg et al. | 395/800 |

OTHER PUBLICATIONS

Hennessy et al., "6.7 Advanced Pipelining—Dynamic Scheduling in Pipelines," *Computer Architecture—A Quantitative Approach*, 1990, pp. 290–305.
Johnson, Mike, "Chapter 7—Out-of-Order Issue," *Superscalar Microprocessor Design*, 1991, pp. 127–146.

*Primary Examiner*—Jack B. Harvey
*Assistant Examiner*—Sumati Lefkowitz
*Attorney, Agent, or Firm*—Staas & Halsey

[57] ABSTRACT

A microprocessor which can simultaneously execute a plurality of instructions (predetermined number of instructions, i.e., m-instructions which are transferred to a plurality of registers. When the instructions within the m-instructions are transferred to the registers, the instructions are executed in order of the executable state of the instructions regardless of order of the transfer. Further, when n-instructions (n>m) are simultaneously set to the executable state for every one clock cycle, the n-instructions are executed in order of the transfer of the instructions. Accordingly, it is possible to realize high speed and effective execution of instructions.

8 Claims, 22 Drawing Sheets

Fig.16

| s0 | s1 | s2 | s3 | ADDRESS |
|----|----|----|----|---------|
| 0 0 | 0 1 | 1 0 | 1 1 | 0 0 0 0 0 |
| 0 0 | 0 1 | 1 1 | 1 0 | 0 0 0 0 1 |
| 0 0 | 1 0 | 0 1 | 1 1 | 0 0 0 1 0 |
| 0 0 | 1 0 | 1 1 | 0 1 | 0 0 0 1 1 |
| 0 0 | 1 1 | 0 1 | 1 0 | 0 0 1 0 0 |
| 0 0 | 1 1 | 1 0 | 0 1 | 0 0 1 0 1 |
| 0 1 | 0 0 | 1 0 | 1 1 | 0 0 1 1 0 |
| 0 1 | 0 0 | 1 1 | 1 0 | 0 0 1 1 1 |
| 0 1 | 1 0 | 0 0 | 1 1 | 0 1 0 0 0 |
| 0 1 | 1 0 | 1 1 | 0 0 | 0 1 0 0 1 |
| 0 1 | 1 1 | 0 0 | 1 0 | 0 1 0 1 0 |
| 0 1 | 1 1 | 1 0 | 0 0 | 0 1 0 1 1 |
| 1 0 | 0 0 | 0 1 | 1 1 | 0 1 1 0 0 |
| 1 0 | 0 0 | 1 1 | 0 1 | 0 1 1 0 1 |
| 1 0 | 0 1 | 0 0 | 1 1 | 0 1 1 1 0 |
| 1 0 | 0 1 | 1 1 | 0 0 | 0 1 1 1 1 |
| 1 0 | 1 1 | 0 0 | 0 1 | 1 0 0 0 1 |
| 1 0 | 1 1 | 1 0 | 0 0 | 1 0 0 1 0 |
| 1 1 | 0 0 | 0 1 | 1 0 | 1 0 0 1 1 |
| 1 1 | 0 0 | 1 0 | 0 1 | 1 0 1 0 0 |
| 1 1 | 0 1 | 0 0 | 1 0 | 1 0 1 0 1 |
| 1 1 | 0 1 | 1 0 | 0 0 | 1 0 1 1 0 |
| 1 1 | 1 0 | 0 0 | 0 1 | 1 0 1 1 1 |
| 1 1 | 1 0 | 0 1 | 0 0 | 1 1 0 0 0 |

Fig.17A

START OF CYCLE

| RS.No. | s-BIT | v-BIT | e-BIT |
|---|---|---|---|
| 0 | 10 | 1 | 0 |
| 1 | 11 | 1 | 0 |
| 2 | 01 | 1 | 1 |
| 3 | 00 | 1 | 1 |

→

END OF CYCLE

| RS.No. | s-BIT | v-BIT | e-BIT |
|---|---|---|---|
| 0 | 00 | 1 | 1 |
| 1 | 01 | 1 | 1 |
| 2 | 10 | ? | 0 |
| 3 | 11 | ? | 0 |

Fig.17B

START OF CYCLE

| RS.No. | s-BIT | v-BIT | e-BIT |
|---|---|---|---|
| 0 | 10 | 1 | 1 |
| 1 | 11 | 1 | 0 |
| 2 | 01 | 1 | 1 |
| 3 | 00 | 0 | 0 |

→

END OF CYCLE

| RS.No. | s-BIT | v-BIT | e-BIT |
|---|---|---|---|
| 0 | 10 | ? | ? |
| 1 | 01 | 1 | 1 |
| 2 | 11 | ? | ? |
| 3 | 00 | ? | ? |

Fig.17C

START OF CYCLE

| RS.No. | s-BIT | v-BIT | e-BIT |
|---|---|---|---|
| 0 | 1 0 | 1 | 1 |
| 1 | 1 1 | 1 | 0 |
| 2 | 0 1 | 0 | 0 |
| 3 | 0 0 | 1 | 1 |

→

END OF CYCLE

| RS.No. | s-BIT | v-BIT | e-BIT |
|---|---|---|---|
| 0 | 1 1 | ? | ? |
| 1 | 0 1 | 1 | 1 |
| 2 | 0 0 | ? | ? |
| 3 | 1 0 | ? | ? |

Fig.17D

START OF CYCLE

| RS.No. | s-BIT | v-BIT | e-BIT |
|---|---|---|---|
| 0 | 1 0 | 1 | 0 |
| 1 | 1 1 | 0 | 0 |
| 2 | 0 1 | 1 | 1 |
| 3 | 0 0 | 1 | 1 |

→

END OF CYCLE

| RS.No. | s-BIT | v-BIT | e-BIT |
|---|---|---|---|
| 0 | 0 0 | 1 | 1 |
| 1 | 0 1 | ? | ? |
| 2 | 1 0 | ? | ? |
| 3 | 1 1 | ? | ? |

Fig.17E

START OF CYCLE

| RS.No. | s-BIT | v-BIT | e-BIT |
|---|---|---|---|
| 0 | 1 0 | 0 | 0 |
| 1 | 1 1 | 1 | 0 |
| 2 | 0 1 | 1 | 1 |
| 3 | 0 1 | 1 | 1 |

→

END OF CYCLE

| RS.No. | s-BIT | v-BIT | e-BIT |
|---|---|---|---|
| 0 | 0 0 | ? | ? |
| 1 | 0 1 | 1 | 1 |
| 2 | 1 0 | ? | ? |
| 3 | 1 1 | ? | ? |

Fig.18A

START OF CYCLE

| RS.No. | s-BIT | v-BIT | e-BIT |
|---|---|---|---|
| 0 | 1 0 | 1 | 1 |
| 1 | 1 1 | 1 | 1 |
| 2 | 0 1 | 0 | 0 |
| 3 | 0 0 | 0 | 0 |

→

END OF CYCLE

| RS.No. | s-BIT | v-BIT | e-BIT |
|---|---|---|---|
| 0 | 0 0 | ? | ? |
| 1 | 1 1 | ? | ? |
| 2 | 0 1 | ? | ? |
| 3 | 0 0 | ? | ? |

Fig.18B

START OF CYCLE

| RS.No. | s-BIT | v-BIT | e-BIT |
|---|---|---|---|
| 0 | 1 0 | 1 | 1 |
| 1 | 1 1 | 0 | 0 |
| 2 | 0 1 | 0 | 0 |
| 3 | 0 0 | 1 | 1 |

→

END OF CYCLE

| RS.No. | s-BIT | v-BIT | e-BIT |
|---|---|---|---|
| 0 | 1 0 | ? | ? |
| 1 | 0 1 | ? | ? |
| 2 | 0 0 | ? | ? |
| 3 | 1 1 | ? | ? |

Fig.18C

START OF CYCLE

| RS.No. | s-BIT | v-BIT | e-BIT |
|---|---|---|---|
| 0 | 10 | 0 | 0 |
| 1 | 11 | 0 | 0 |
| 2 | 01 | 1 | 1 |
| 3 | 00 | 1 | 1 |

→

END OF CYCLE

| RS.No. | s-BIT | v-BIT | e-BIT |
|---|---|---|---|
| 0 | 00 | ? | ? |
| 1 | 01 | ? | ? |
| 2 | 10 | ? | ? |
| 3 | 11 | ? | ? |

Fig.18D

START OF CYCLE

| RS.No. | s-BIT | v-BIT | e-BIT |
|---|---|---|---|
| 0 | 10 | 1 | 1 |
| 1 | 11 | 0 | 0 |
| 2 | 01 | 1 | 1 |
| 3 | 00 | 0 | 0 |

→

END OF CYCLE

| RS.No. | s-BIT | v-BIT | e-BIT |
|---|---|---|---|
| 0 | 00 | ? | ? |
| 1 | 01 | ? | ? |
| 2 | 11 | ? | ? |
| 3 | 00 | ? | ? |

Fig.18E

START OF CYCLE

| RS.No. | s-BIT | v-BIT | e-BIT |
|---|---|---|---|
| 0 | 10 | 0 | 0 |
| 1 | 11 | 1 | 1 |
| 2 | 01 | 0 | 0 |
| 3 | 01 | 1 | 1 |

→

END OF CYCLE

| RS.No. | s-BIT | v-BIT | e-BIT |
|---|---|---|---|
| 0 | 01 | ? | ? |
| 1 | 10 | ? | ? |
| 2 | 00 | ? | ? |
| 3 | 11 | ? | ? |

Fig.19A

START OF CYCLE

| RS.No. | s-BIT | v-BIT | e-BIT |
|---|---|---|---|
| 0 | 10 | 0 | 0 |
| 1 | 11 | 1 | 1 |
| 2 | 01 | 1 | 1 |
| 3 | 00 | 0 | 0 |

→

END OF CYCLE

| RS.No. | s-BIT | v-BIT | e-BIT |
|---|---|---|---|
| 0 | 01 | ? | ? |
| 1 | 10 | ? | ? |
| 2 | 11 | ? | ? |
| 3 | 00 | ? | ? |

Fig.19B

START OF CYCLE

| RS.No. | s-BIT | v-BIT | e-BIT |
|---|---|---|---|
| 0 | 10 | 1 | 1 |
| 1 | 11 | 0 | 0 |
| 2 | 01 | 0 | 0 |
| 3 | 00 | 0 | 0 |

→

END OF CYCLE

| RS.No. | s-BIT | v-BIT | e-BIT |
|---|---|---|---|
| 0 | 11 | ? | ? |
| 1 | 10 | ? | ? |
| 2 | 01 | ? | ? |
| 3 | 00 | ? | ? |

Fig.19C

START OF CYCLE

| RS.No. | s-BIT | v-BIT | e-BIT |
|---|---|---|---|
| 0 | 10 | 0 | 0 |
| 1 | 11 | 1 | 1 |
| 2 | 01 | 0 | 0 |
| 3 | 00 | 0 | 0 |

→

END OF CYCLE

| RS.No. | s-BIT | v-BIT | e-BIT |
|---|---|---|---|
| 0 | 10 | ? | ? |
| 1 | 11 | ? | ? |
| 2 | 01 | ? | ? |
| 3 | 00 | ? | ? |

Fig.19D

START OF CYCLE

| RS.No. | s-BIT | v-BIT | e-BIT |
|---|---|---|---|
| 0 | 10 | 0 | 0 |
| 1 | 11 | 0 | 0 |
| 2 | 01 | 1 | 1 |
| 3 | 00 | 0 | 0 |

→

END OF CYCLE

| RS.No. | s-BIT | v-BIT | e-BIT |
|---|---|---|---|
| 0 | 01 | ? | ? |
| 1 | 10 | ? | ? |
| 2 | 11 | ? | ? |
| 3 | 00 | ? | ? |

Fig.19E

START OF CYCLE

| RS.No. | s-BIT | v-BIT | e-BIT |
|---|---|---|---|
| 0 | 10 | 0 | 0 |
| 1 | 11 | 0 | 0 |
| 2 | 01 | 0 | 0 |
| 3 | 00 | 1 | 1 |

→

END OF CYCLE

| RS.No. | s-BIT | v-BIT | e-BIT |
|---|---|---|---|
| 0 | 01 | ? | ? |
| 1 | 10 | ? | ? |
| 2 | 00 | ? | ? |
| 3 | 11 | ? | ? |

MICROPROCESSOR CONTROL SYSTEM WHICH SELECTS OPERATING INSTRUCTIONS AND OPERANDS IN AN ORDER BASED UPON THE NUMBER OF TRANSFERRED EXECUTABLE OPERATING INSTRUCTIONS

BACKGROUND OF THE INVENTION

1. Field of the Invention

The present invention relates to a microprocessor control system provided in a microprocessor for effectively controlling transfer of operating instructions and operands therein. The present invention is advantageously used in a personal computer, a work station, etc.

2. Description of the Related Art

There is a known microprocessor control system enabling control of execution for a plurality of operating instructions. In this conventional art, the operating instructions are sequentially transferred and executed in a plurality of registers. That is, the next operating instruction cannot be started until the first operating instruction is completed, i.e., a first-in first-out system. Accordingly, a lot of waiting time is required for execution of a next instruction so that it is difficult to improve execution speed of the instruction as explained in detail below.

The microprocessor control system according to the present invention aims to improve execution speed for the operating instructions in a microprocessor which includes at least an instruction decode unit for decoding operating instructions, an operand holding unit for holding operands of the operating instructions, and a plurality of operation units for executing the operating instructions.

According to the present invention, since it is possible to execute a plurality of operating instructions for every one clock cycle using a plurality of operation units, it is possible to considerably reduce necessary time to execute operating instructions.

SUMMARY OF THE INVENTION

The object of the present invention is to provide a microprocessor control system in a microprocessor enabling high speed and effective execution for a plurality of operating instructions and operands for every one clock cycle.

In accordance with the present invention, there is provided a microprocessor control system provided in a microprocessor, the system including:

an instruction decode unit connected to an instruction memory for decoding operating instructions transferred from the instruction memory;

an operand holding unit connected to a data memory for receiving data and for holding operands for the operating instructions transferred from the instruction decode unit;

a plurality of operation units operatively connected to the instruction decode unit and operand holding unit for executing the operating instructions, and enabling execution of a predetermined number of the operating instructions for every one clock cycle; and an instruction reservation unit connected to the instruction decode unit and the operand holding unit, further connected to the operation unit, for queuing the operating instructions and operands from the instruction decode unit, for selecting the operating instructions and operands when less than a predetermined number of executable operating instructions are transferred, for selecting the predetermined number of the operating instructions and operands in order of programs when more than the predetermined number of executable operating instructions are transferred, and for issuing the selected operating instructions and operands to the operation unit.

In a preferred embodiment, the instruction reservation unit comprises:

an instruction/order of program holding unit operatively connected to the instruction decode unit and the operand holding unit for movably holding the operating instructions and operands in order of the programs;

an executability decision unit connected to the instruction/order of program holding unit for determining whether the transferred operating instructions are executable, and adding the results of the determination of the above into each operating instruction; and an instruction selection unit connected to the instruction/order of program holding unit for selecting the operating instructions and operands when less than the predetermined number of executable operating instructions are transferred, for selecting the predetermined number of the operating instructions and operands in order of programs and in accordance with a holding position in the instruction/order of program holding unit when more than the predetermined number of executable operating instructions are transferred, and for issuing the selected operating instructions and operands to the operation unit.

In another preferred embodiment, the instruction reservation unit comprises:

an instruction holding unit connected to the instruction decode unit and the operand holding unit for holding the operating instructions and operands;

an order of program adding unit connected to the instruction holding unit for adding the order of the programs, which indicates the transferred operating instructions, into the operating instructions which are held in the instruction holding unit;

an executability decision unit connected to the instruction holding unit for determining whether the transferred operating instructions are executable, and adding results of determination of the above into each operating instruction which is held in the instruction holding unit; and an instruction selection unit connected to the instruction holding unit for selecting the operating instructions and operands when fewer executable operating instructions are transferred than the predetermined number, for selecting the predetermined number of the operating instructions and operands in order of programs when more executable operating instructions are transferred than the predetermined number, and for issuing the selected operating instructions and operands to the operation unit.

In still another preferred embodiment, the instruction/order of program holding unit comprises:

an entry update control circuit for receiving "e"-bits and generating selection signals se-10 to se-13;

an "e"-bit preparation circuit for sending "e"-bits to the entry update control circuit;

a plurality of registers; each having a "v"-bit area, an "e"-bit area, an instruction code area, and operand areas, the "v"-bit area receiving "v"-bits from the executability decision unit; the "e"-bit area receiving "e"-bits from the "e"-bit preparation circuit; and the instruction and operand areas receiving the instruction and operand; and further, the "v"-bit area outputting the "v"-bit to the instruction selection circuit; and a plurality of sectors each provided for the corresponding register for selecting the instructions and operands in accordance with the selection signals.

In still another preferred embodiment, the instruction selection unit comprises seven AND gates and two OR gates, each of the AND gates receiving the "v"-bits, each of the OR gates receiving outputs from the AND gates, and the "v"-bits (v2 and v3) being directly output from instruction selection unit.

In still another preferred embodiment, the "e"-bit preparation circuit comprises one AND gate receiving the entry selection signals, and one OR gate receiving output signals from the instruction selection circuit and outputting "e"-bits.

In still another preferred embodiment, the executability decision unit comprises two comparators for comparing an instruction code with the state of a register, and an OR gate for outputting the "v"-bit.

In still another preferred embodiment, the instruction/order of program holding unit further comprises an "s"-bit preparation circuit for receiving the outputs of the entry update control circuit and the instruction selection circuit, and generating "s"-bits to send to the registers.

In still another preferred embodiment, the register further comprises an "s"-bit area in order to receive the "s"-bit from the "s"-bit preparation circuit.

In still another preferred embodiment, the instruction selection circuit further comprises a switch unit for receiving "s"-bits and "v"-bits.

In still another preferred embodiment, the switch unit comprises four sets of AND gates each corresponding to "s"-bit and "v"-bits.

In still another preferred embodiment, the "s"-bit preparation circuit comprises an "s"-bit control circuit for receiving selection signals and output signals, two subtracters for calculating subtraction numbers, and an arrangement unit for arranging the result of the subtraction numbers.

In still another preferred embodiment, the "s"-bit control circuit comprises a table for storing a relationship between "s"-bits and an address.

BRIEF DESCRIPTION OF THE DRAWINGS

In the drawings:

FIG. 16 is a table of the "s"-bits and corresponding addresses shown in FIG. 15; and FIGS. 17A to 19E are explanatory views of the relationship among an RS number and "s"-, "v"- and "e"-bits in order to explain a state of the "s"-bits.

DESCRIPTION OF THE PREFERRED EMBODIMENTS

Before describing the preferred embodiments, a conventional art and its problem will be explained in detail below.

Figure 1:
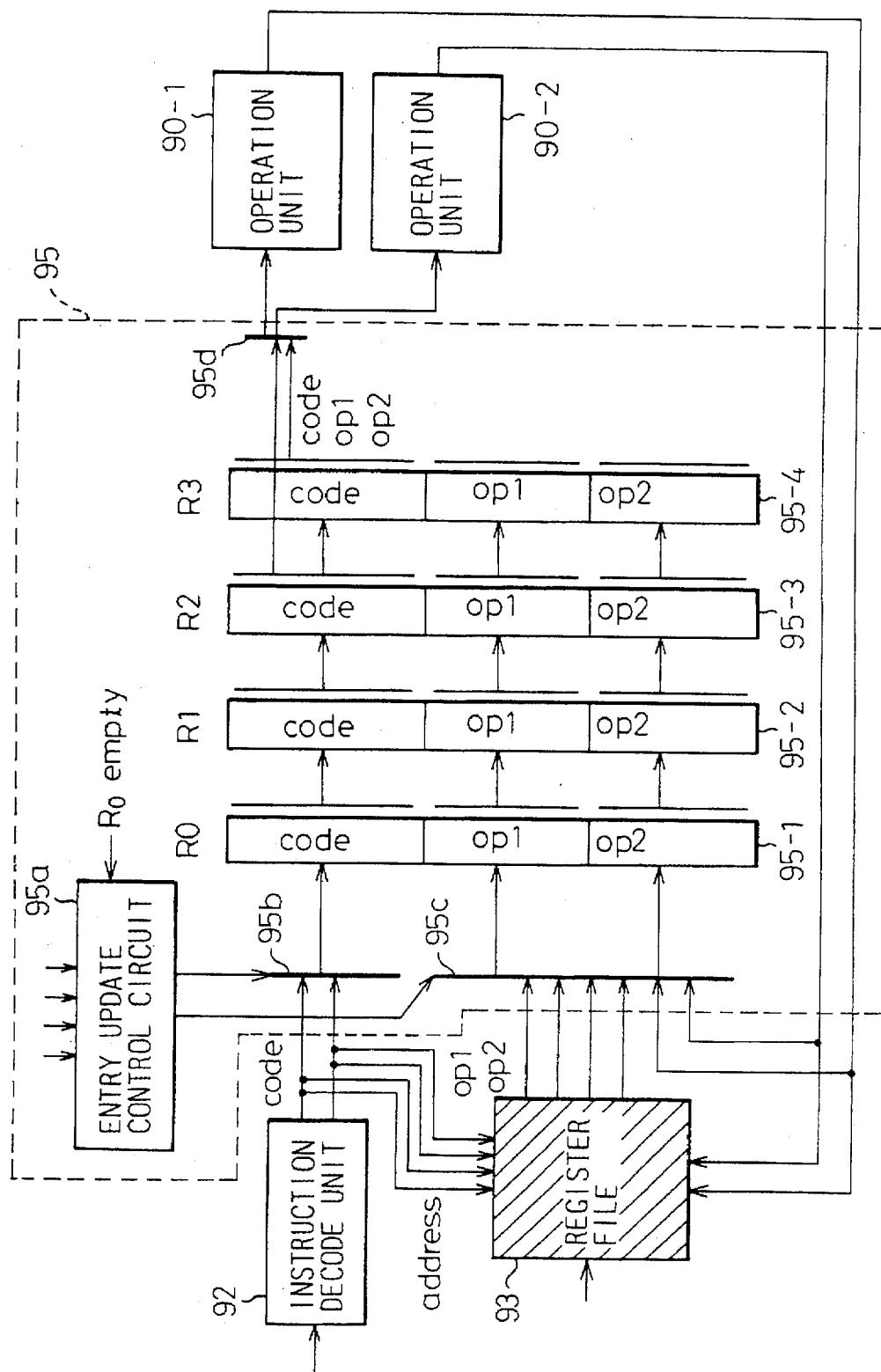
FIG. 1 is a schematic block diagram of a microprocessor control system enabling execution of a plurality of operating instructions in a conventional art.

FIG. 1 is a schematic block diagram of a microprocessor control system enabling execution of a plurality of operating instructions for every one clock cycle in a conventional art. As shown in the drawing, the microprocessor includes: an instruction decode unit 92 for decoding the operating instructions; a register file 93 for holding operands for the operating instructions; operation units 90-1 and 90-2 for executing the operating instructions; registers 95-1 to 95-4 (R0 to R3) for sequentially holding the operating instructions in order of the program, and for sending the operating instructions to the operation units 90-1 and 90-2 in order of the program; an entry update control circuit 95a for selecting the issued operating instructions and operands when the register 95-1 becomes vacant, and inputting them into the register 95-1; selectors 95b and 95c for selecting outputs from the instruction decode unit 92 and the register 93 in accordance with an instruction from the entry update control circuit 95a; and a selector 95d for selecting the operating instructions and operands from the register 95-4.

In this structure, registers 95-1 to 95-4, the entry update control circuit 95a and selectors 95b to 95d are FIFO (first-in first-out), registers and these components are included in a reservation station (RS) 95. Further, each register is formed of a first operand area (op1), a second operand area (op2) and an instruction code area (code).

The operating instructions (or, programs) are previously stored in an instruction memory. The data are stored in a data memory. When the operating instructions are read from the memory, and input to the instruction decode unit 92, two instructions are read from the memory for every one cycle. Next, the instruction decode unit 92 decodes an operating instruction, and sends it to the register 95-1 in accordance with the vacant state thereof. It is possible to send two operating instructions for every one cycle.

When all operands are provided in the registers (reservation station 95) in order to execute the operating instructions at a time when the operating instructions are sent from the instruction decode unit 92, the operating instructions and operands are sent to the operation unit 90. When all operands are not provided, the execution of the operating instructions are stood ready until all operands are provided in the registers.

In this conventional art, since the reservation station 95 is structured as a FIFO, for example, when two operating instructions, which can be executed in parallel in one cycle, are read from the memory, if the previous operating instruction is not set to an executable state, the following instruction (even if this instruction is set to the executable state) cannot be executed until the previous instruction is set to the executable state.

Further, although the reservation station 95 includes four registers 95-1 to 95-4, it is possible to provide more registers. The operation unit 90-1 or 90-2 executes the operations for every cycle or for plural clock cycles, and the results of the operations at the operation unit are written into the register file 93 and the reservation station 95.

Accordingly, in general, when the reservation station 95 can simultaneously execute plural operating instructions (below, m-instructions) for every clock cycle, if the first operating instruction is not executed, the following instructions cannot be executed until the first instruction is executed even if the following instructions are set to the executable state. Accordingly, a lot of waiting time is required until a next execution is started so that it is very difficult to raise the execution speed of the operating instructions.

Further, when a plurality of operating instructions (n-instructions (n>m)) are simultaneously set to the executable state, and when a plurality of operating instructions (m-instructions) included in the n-instructions must be executed, some instructions within the m-instructions cannot be executed and remain in the stand-ready state if the order of the transfer of the instructions is ignored.

The object of the present invention lies in the solution of the above problems. That is, in a microprocessor which can simultaneously execute a plurality of instructions (predetermined number of instructions, i.e., m-instructions), when the instructions within the m-instructions are transferred to the registers, the instructions are executed in order of the executable state of the instructions regardless of order of the transfer. Further, when n-instructions (n>m) are simultaneously set to the executable state for every one clock cycle, the n-instructions are executed in order of the transfer of the instructions. Accordingly, it is possible to realize high speed and effective execution of instructions.

Figure 2:
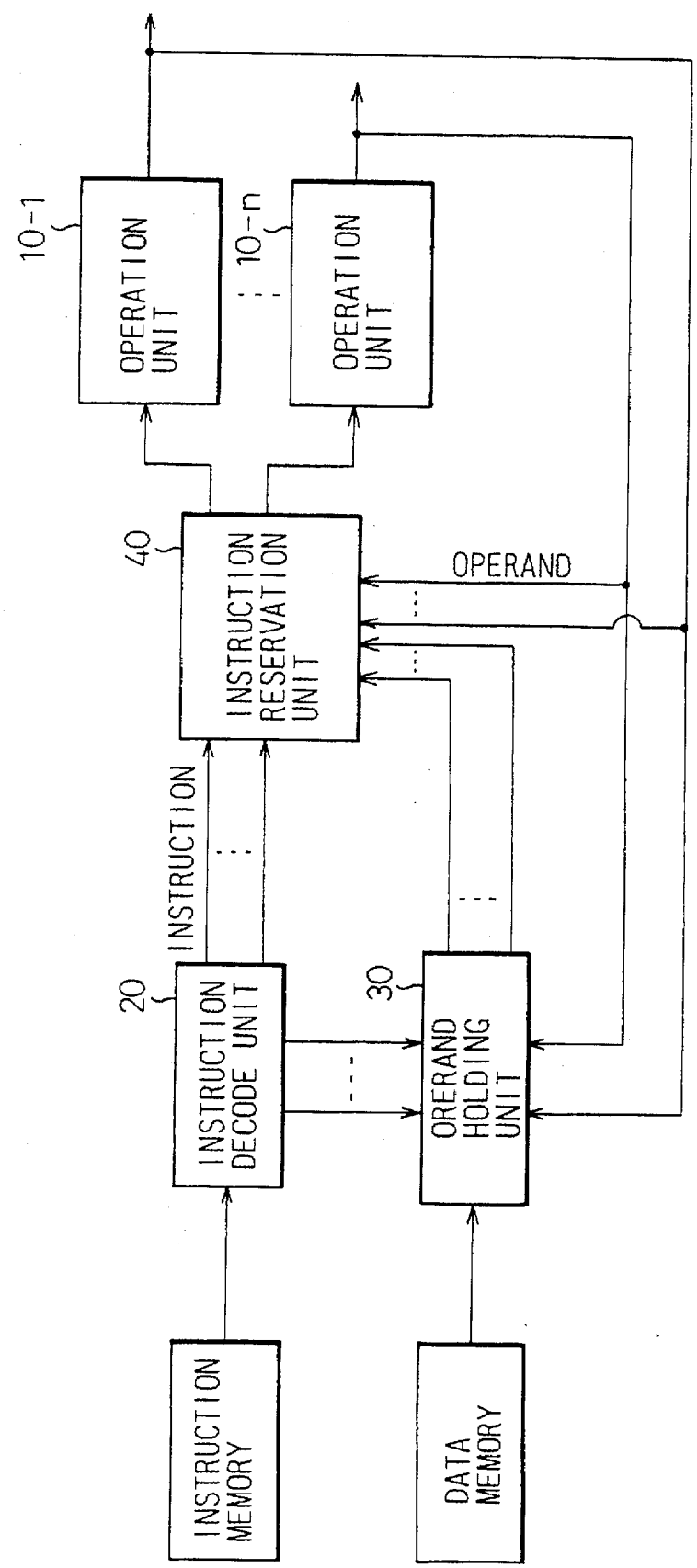
FIG. 2 is a basic structural view of a microprocessor control system according to the present invention.

FIG. 2 is a basic structural view of a microprocessor control system according to the present invention. The microprocessor control system includes: an instruction decode unit 20 which receives the operating instructions from the instruction memory; an operand holding unit 30 which receives data from the data memory and holds operands of operating instructions; a plurality of operation units 10-1 to 10-n for executing operating instructions; and an instruction reservation unit 40.

The instruction reservation unit 40 queues the operating instructions and operands sent from the instruction decode unit 20, selects the operating instructions and operands when fewer executable instructions are transferred than a predetermined number of instructions, selects the operating instructions and operands in accordance with order of the programs when more executable instructions are transferred than the predetermined number of instructions, and sends the selected operating instructions and operands to the operation units 10-1 to 10-n.

In the above, the predetermined number of instructions indicates the number of operating instructions which can be executed for every one clock cycle. Basically, although the predetermined number should correspond to the number of the operation units 10-1 to 10-n, there is no problem if the predetermined numbers are smaller than the number of the operation units.

Since the operating instructions and operands are selected in order of the programs, it is possible to avoid the occurrence of instructions which are not executed and remain in the registers.

According to the present invention, the order of execution for the instructions is not fixed in accordance with the order of the transfer applied by the instruction decode unit 20. When the transferred instructions are fewer than the predetermined number, the instructions are sequentially executed in order of the executable instructions so that it is possible to achieve high speed and effective execution.

Figure 3:
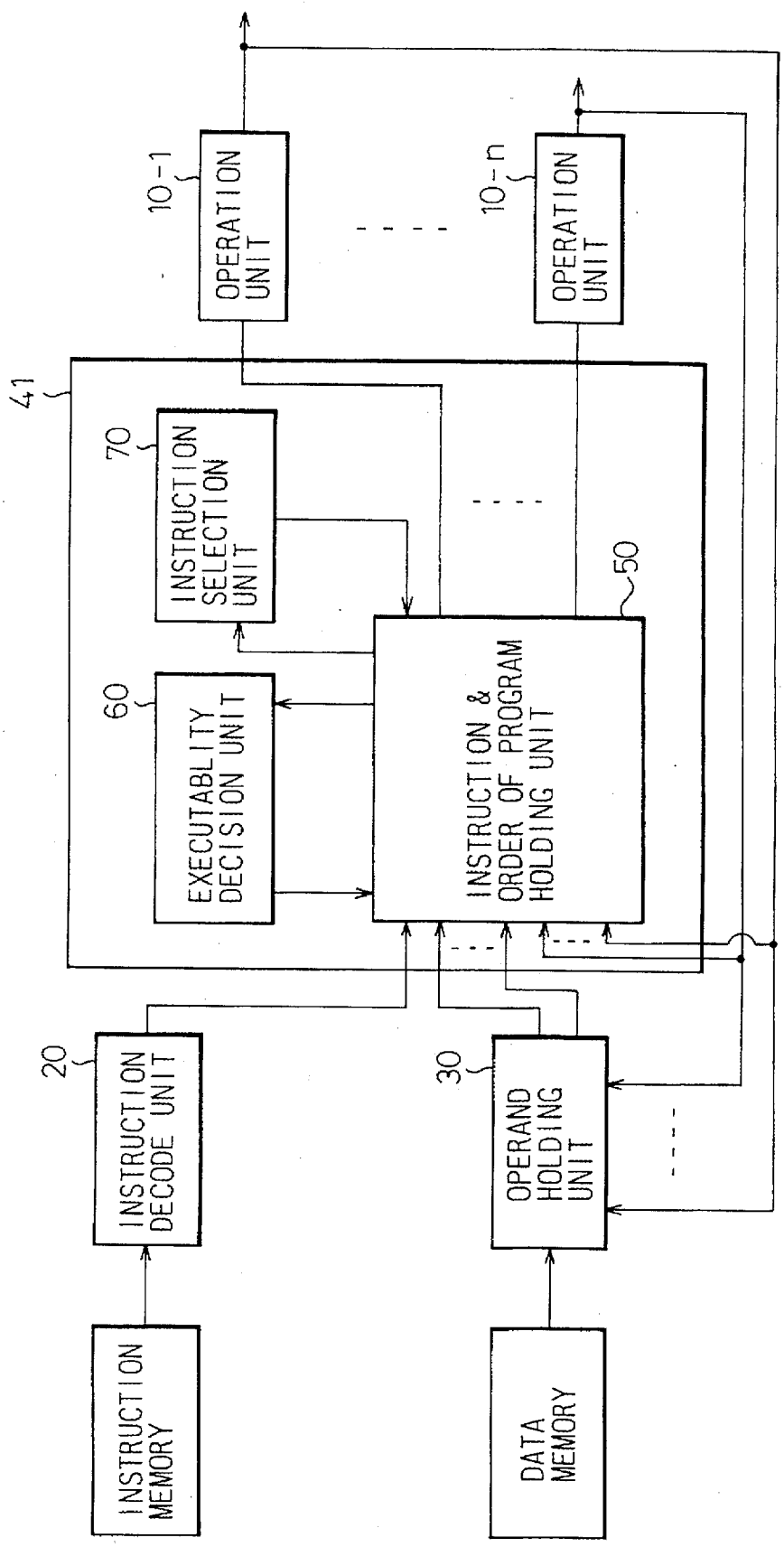
FIG. 3 is a schematic block diagram of a microprocessor control system according to a first example of a first embodiment of the present invention.

FIG. 3 is a schematic block diagram of a microprocessor control system according to a first example of a first embodiment of the present invention. The instruction reservation unit 41 includes: an instruction/order of program holding unit 50 for movably holding the instructions and operands in accordance with order of the program of the operating instructions; an executability decision unit 60 for determining whether the operation instructions are executable, and for adding the result of determination of above into the instructions; and an instruction selection unit 70.

The instruction selection unit 70 selects the operating instructions and operands when fewer executable instructions are transferred than the predetermined number of instructions, selects the operating instructions and operands in accordance with order of the program based on the holding position in the instruction/order of program holding unit 50 when more executable .instructions are transferred than the predetermined number of instructions, and issues the selected operating instructions and operands to the operation units 10-1 to 10-n.

Figure 4:
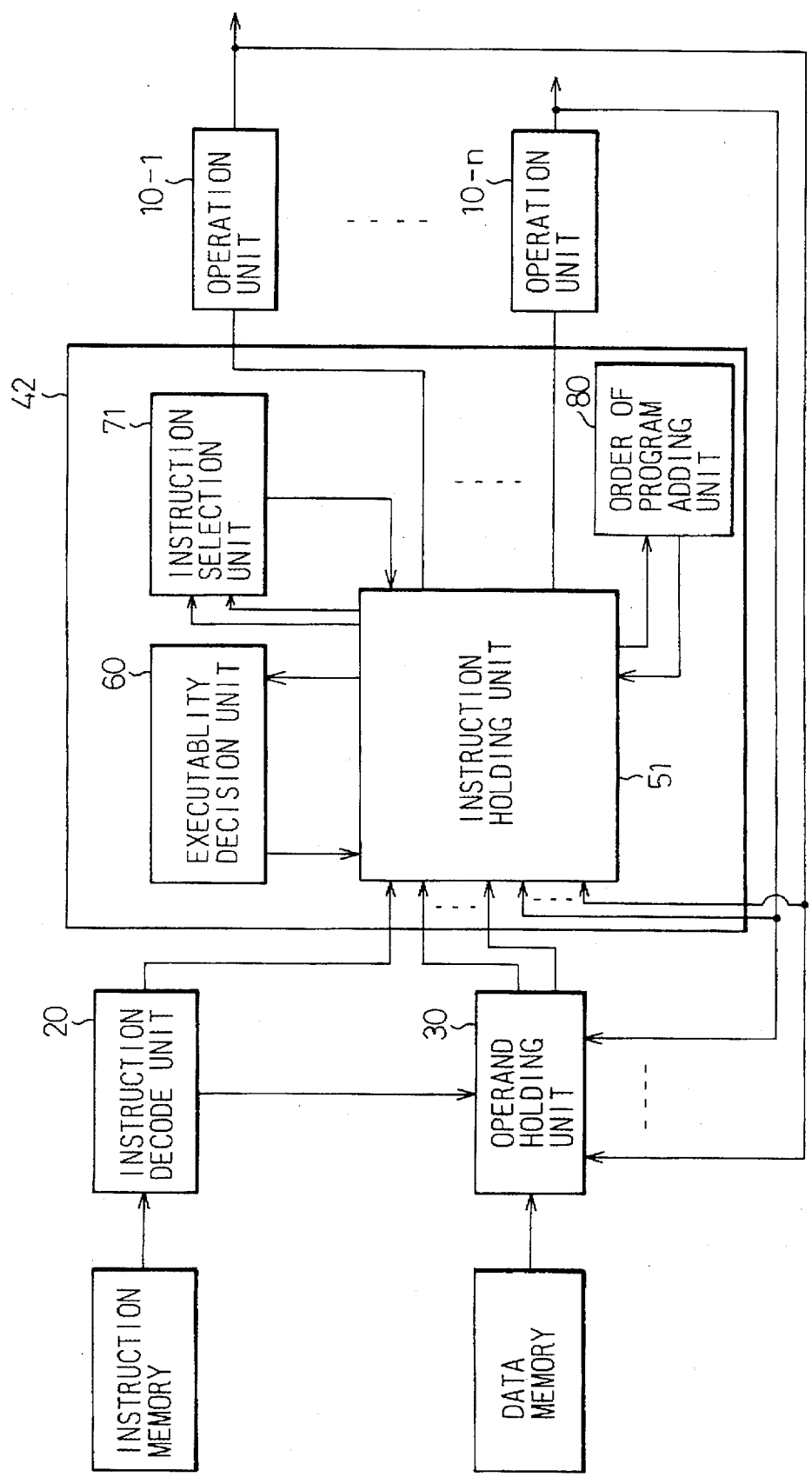
FIG. 4 is a schematic block diagram of a microprocessor control system according to a second example of the first embodiment of the present invention.

FIG. 4 is a schematic block diagram of a microprocessor control system according to a second example of the first embodiment of the present invention. The instruction reservation unit 42 includes: an instruction holding unit 51 for holding the operating instructions and operands; an order of program adding unit 80 for adding order of the program to the operating instructions which are held in the instruction holding unit 51; an executability decision unit 60 for determining executability of the transferred operating instructions, and adding the result of determination of above into the instructions which are held in the instruction holding unit 51; and an instruction selection unit 71.

The instruction selection unit 71 selects the operating instructions and operands when fewer executable instructions are transferred than the predetermined number of instructions, selects the operating instructions and operands in accordance with order of program when more executable instructions are transferred than the predetermined number of instructions, and issues the selected operating instructions and operands to the operation units 10-1 to 10-n.

Based on the structure shown in FIG. 2, when the operating instructions are transferred from the instruction decode unit 20, the operating instructions temporarily stand ready to execute the operating instructions in the instruction reservation unit 40. Further, when the operands to be operated are sent from the operand holding unit 30, the instruction reservation unit 40 can execute the operating instructions.

As explained above, when the executable operation instructions stands ready to be executed in the instruction reservation unit 40, when the number of the executable operating instructions are less than the predetermined number of instructions, in spite of the order of the transfer of the operating instructions which stand ready to be executed, the instruction reservation unit 40 selects the executable operating instructions and operands and sends them to the operation units 10-1 to 10-n to execute the operating instructions.

On the other hand, when the number of the executable operating instructions are more than the predetermined number of instructions, the instruction reservation unit 40 selects the operating instructions and operands of the predetermined number which are counted in order of the programs, and sends them to the operation units 10-1 to 10-n.

In the first example shown in FIG. 3, the instruction reservation unit 41 includes an executability decision unit 60, an instruction/order of program holding unit 50 and an instruction selection unit 70. It is possible to quickly and precisely make the decision for the executable operating instructions, and to execute the executable operating instructions in spite of the order of the transfer of the instructions by using the executability decision unit 60.

In the second example shown in FIG. 4, the instruction reservation unit 42 includes the executability decision unit 60, the instruction holding unit 51, the instruction selection unit 71 and the order of program adding unit 80. As in the first embodiment, it is possible to quickly and precisely make the decision on the executable operating instructions, and to execute the executable operating instructions in spite of the order of the programs by using the executability decision unit 60. Further, unlike the first example, the instruction holding unit 51 and the order of program adding unit 80 are provided instead of the instruction/order of program holding unit 50. Accordingly, it is not necessary to move the transferred instructions in accordance with order of the program by using the instruction/order of program holding unit 50. Only the order of the programs are added to the transferred instructions by using the order of program adding unit 80. Accordingly, it is possible to simplify the structure of the instruction holding unit 51 in comparison with the instruction/order of program holding unit 50.

Figure 5:
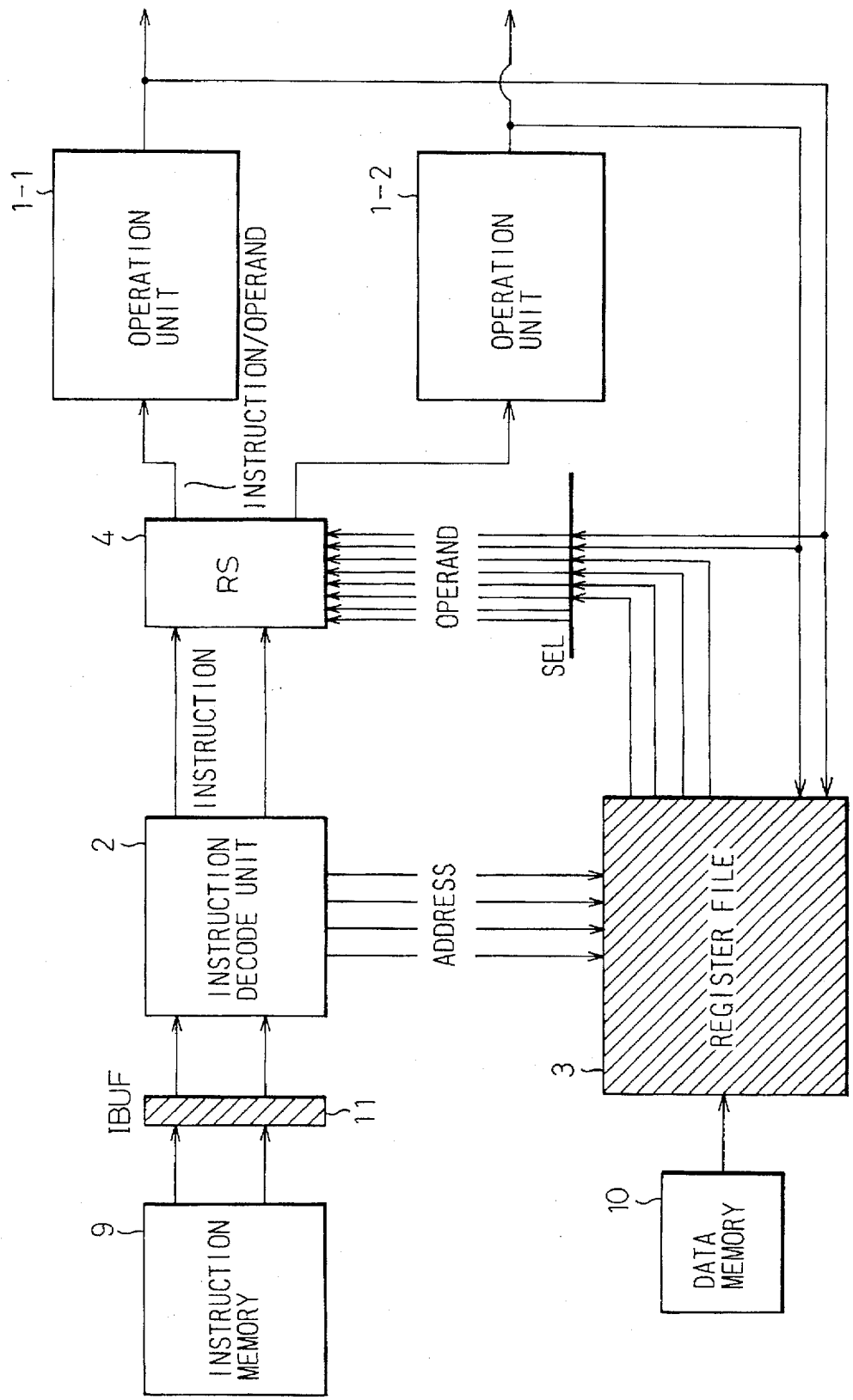
FIG. 5 is a block diagram of a complete microprocessor control system according to the first embodiment.

FIG. 5 is a block diagram of a complete microprocessor control system according to the first embodiment. The microprocessor control system includes: an instruction memory 9 for storing instructions; a data memory (for example, cache memory) 10 for storing data; an instruction buffer 11 (IBUF); an instruction decode unit 2 which can read two operating instructions for every one clock cycle, decode the instructions, and transfer the instructions in accordance with vacant state of the reservation station (RS) 4; and a register file 3 for holding operands (this register file corresponds to the operand holding unit 30). Further, the reservation station (RS) 4 corresponds to the instruction reservation unit 40, and stands ready to execute the operating instructions and operands. Further, SEL denotes selectors.

Still further, when the number of the executable operating instructions is less than the predetermined number, the reservation station 4 selects the executable operating instructions and operands in spite of order of the program, and issues the selected instructions and operands to the operation units 1-1 and 1-2. Still further, when the number of the executable operating instructions are more than the predetermined number, the reservation station 4 selects the predetermined number of the operating instructions and operands in order of the program, and issues the selected instructions and operands to the operation units 1-1 and 1-2. The operation units 1-1 and 1-2 execute the operating instructions for every one clock cycle or during plural clock cycles.

Figure 6:
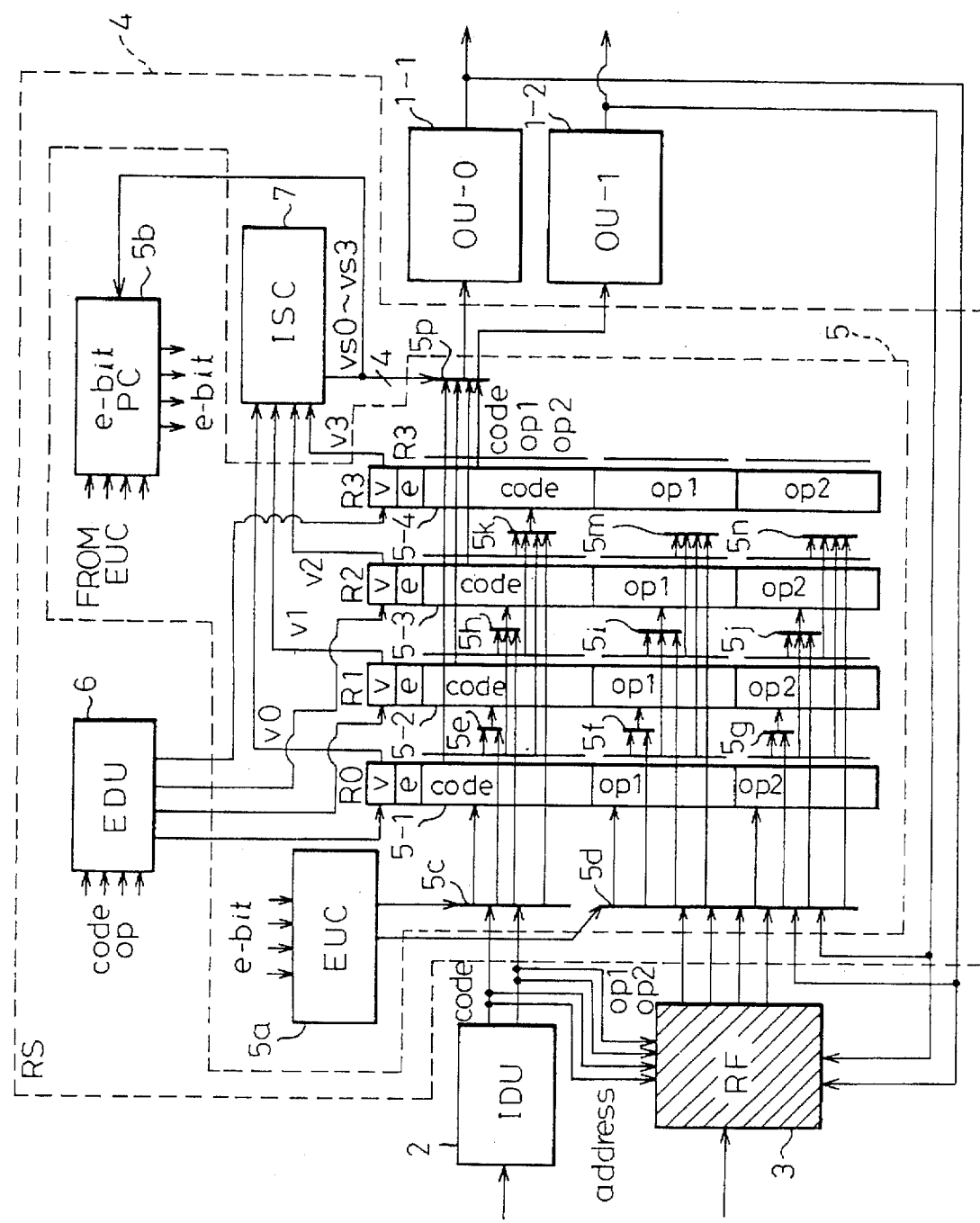
FIG. 6 is a detailed block diagram of the first embodiment shown in FIG. 5.

FIG. 6 is a detailed block diagram of the first embodiment shown in FIG. 5. The reservation station (RS) 4 includes an instruction/order of program holding unit 5, an executability decision unit (EDU) 6 and an instruction selection circuit (ISC) 7.

The instruction/order of program holding unit 5 further includes an entry update control circuit (EUC) 5a, an "e"-bit preparation circuit (e-bit PC) 5b, selectors 5c to 5n and 5p, and registers 5-1 to 5-4 (R0 to R3). The entry update control circuit 5a receives the "e"-bits from the "e"-bit preparation circuit 5b. The "e"-bit preparation circuit 5b receives the output of the entry update control circuit 5a.

The executability decision unit (EDU) 6 includes a dependency check circuit for determining whether the operating instructions held in each register are executable in accordance with the operands, and adding the "v"-bit indicating executability to each instruction. In this case, for example, when "v"-bit is "1", the operating instruction is executable and this "v"-bit is added to the instruction in the register Rn.

In this embodiment, each register Rn is formed of a "v"-bit area, an "e"-bit area, the instruction code area (code), and the operand areas 1 and 2 (op1 and op2). The "v"-bits are input from the executability decision unit 6 to each "v" area of the registers R0 to R3.

As shown in the drawing, the selectors are provided at each output of the register Rn. That is, the selector 5e receives the code of the register R0 and the output of the selector 5c; the selector 5h receives the code of the register R1, the code of the register R0 and the output of the selector 5c; and the selector 5k receives the code of the register R2, the code of the register R1, the code of the register R0 and the output of the selector 5c. Further, the selector 5p receives the codes and operands from all registers R0 to R3.

The instruction selection circuit (ISC) 7 receives the "v"-bits from each register R0 to R3. When the number of the executable instructions is less than the predetermined number (two), the instruction selection circuit 7 selects the instruction in spite of the position of the instruction which is held in the instruction/order of program holding unit 5. When the number of the executable instructions is more than the predetermined number, the instruction selection circuit 7 selects the predetermined number of the instructions in order of the program in accordance with the holding position in the order of program holding unit 5, and issues the instructions to the operation units 1-1 and 1-2.

Figure 10:
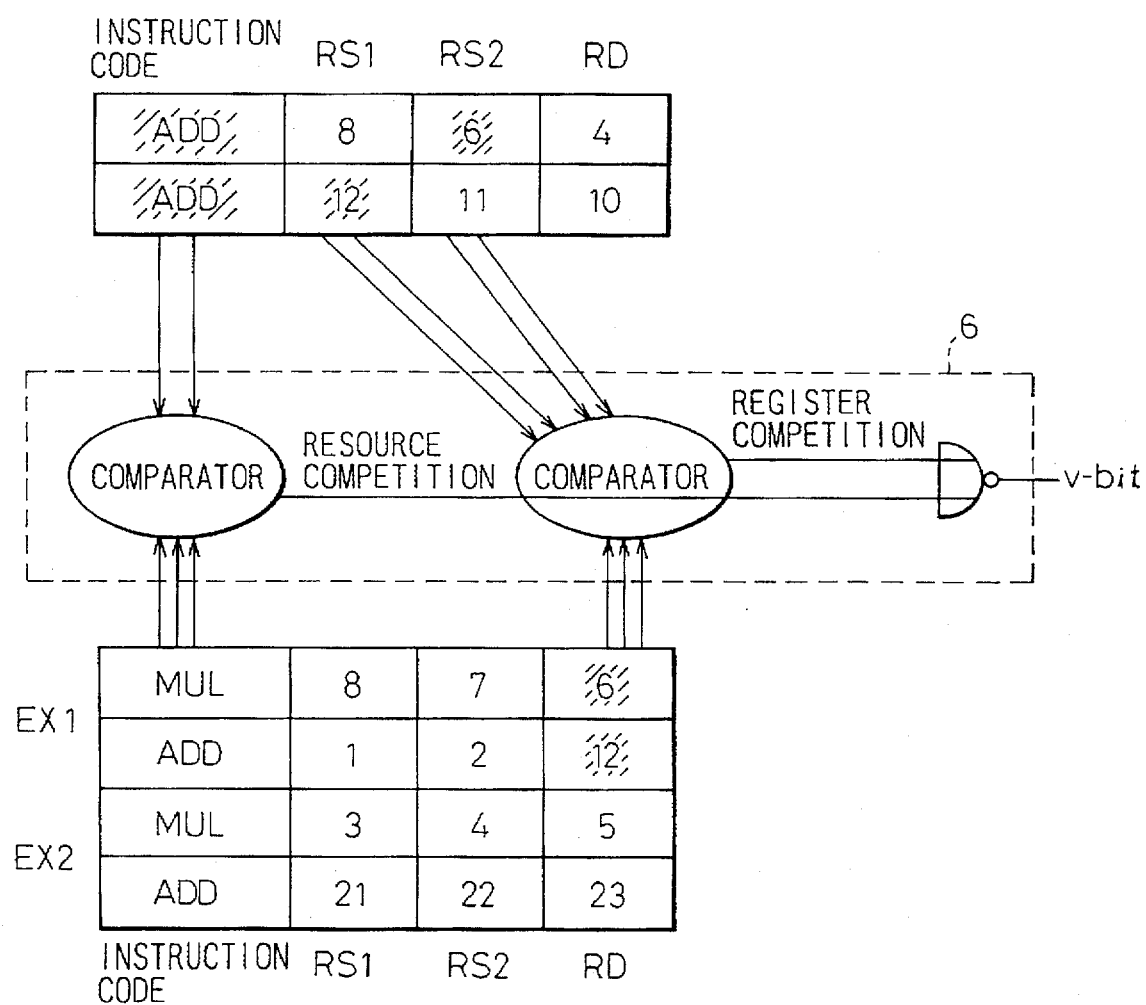
FIG. 10 is an explanatory view for explaining dependency check according to the first embodiment.

The following explanations are given to the term "dependency" with reference to FIG. 10. That is, FIG. 10 is an explanatory view for explaining dependency check according to the first embodiment. Regarding the term "dependency", this means that a register address of an input data, which is included in the instruction in process of decoding, coincides with a register address to be written by the data which is included in the instruction in process of executing (this state is called "competition of the register number"). In another case, this term means that a piece of hardware (i.e., operation unit) used for executing the instruction in the process of decoding is currently being used, and further, the hardware is being used at the timing when executing the instruction in process of decoding in the next clock cycle (this state is called "competition of the hardware resource").

In FIG. 10, RS denotes the register number, ADD and MUL denote the instruction code. The dependency check circuit 6 stores a kind of the hardware (i.e., instruction code) in process of execution in any one cycle and the number of output register in process of use. Further, the dependency check circuit 6 compares the instruction code with the register number in process of decoding. Each of two comparators in the dependency check circuit 6 may be formed of an EXNOR logic gate.

The execution stage is formed of two stages of pipelines EX1 and EX2, and two instructions can be simultaneously decoded and executed. However, if two instructions are the same kind, these two instructions cannot be executed at the same time. In the drawing, the instructions to be decoded are both "AND" operations. This indicates competition between the resources since the same two kinds of operations cannot be executed at the same time. The instructions ADD 8, 6 and 4 stand ready to be executed in one clock cycle.

The output registers 6 and 12 for the instructions that are in the process of being executed in the pipeline EX1 coincide with the number of the input registers in process of decode. This is because these registers 6 and 12 are not determined in the next clock cycle (in process of execution in stage EX2). This indicates that there is competition for the register. As a result, two ADD instructions in process of decode must wait until the competition for the register is resolved.

As shown in FIG. 6, the instruction/order of program holding unit 5 includes four registers. That is, each register 5-1 to 5-4 holds the instruction code (code), the operands (op1 and op2), the "v"-bit and the "e"-bit. The entry update control circuit 5a inputs the issued instruction and operand to a vacant register, and outputs bits se-10 to se-13 (see, FIG. 8) to the selectors 5c to 5n.

The "e"-bit preparation circuit 5b prepares the "e"-bit which indicates whether the instruction is held in each register R in accordance with the bits se-10 to se-13.

Figure 7:
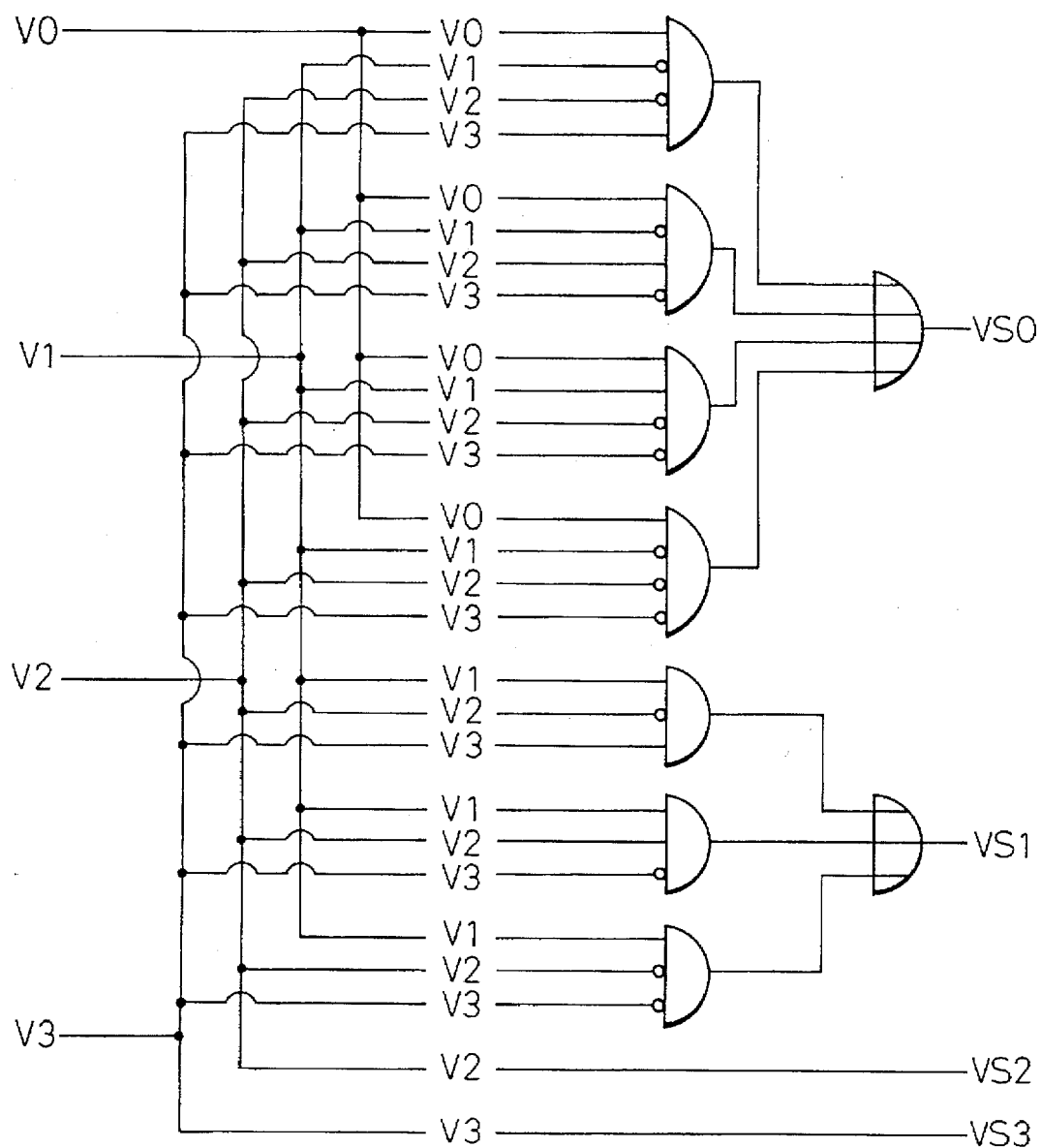
FIG. 7 is a detailed instruction selection circuit according to the first embodiment.

FIG. 7 is a detailed circuit diagram of the instruction selection circuit according to the first embodiment. The instruction selection circuit 7 inputs the "v"-bits v0 to v3 and outputs the bits vs-0 to vs-3.

Figure 8:
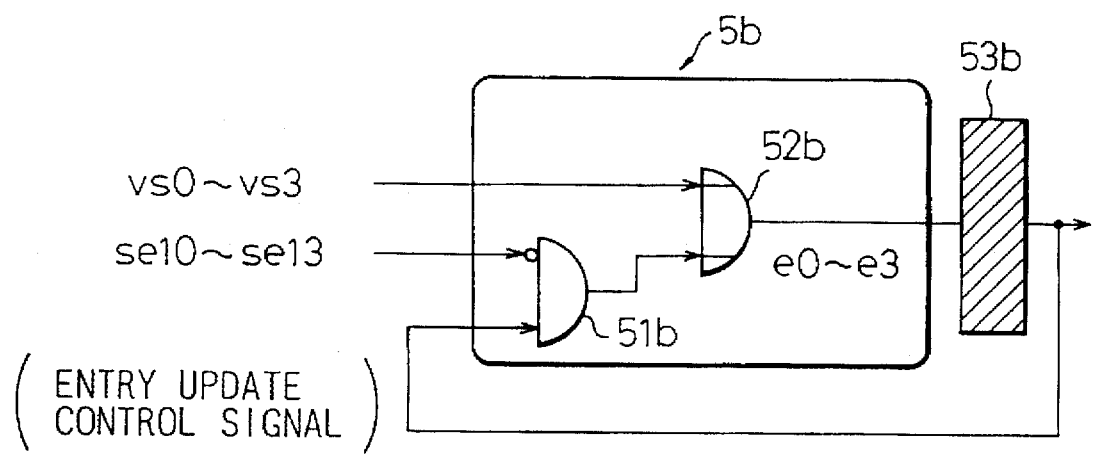
FIG. 8 is a schematic block diagram of an "e"-bit preparation circuit according to the first embodiment.

FIG. 8 is a schematic block diagram of an "e"-bit preparation circuit according to the first embodiment. The "e"-bit preparation circuit 5b is formed of an AND gate 51b, an OR gate 52b and an "e"-bit holding register 53b. The entry update control signals se-10 to se-13 are input from the entry update control circuit 5a, and these signals are inverted by the AND gate 51b. Further, the output signals vs-0 to vs-3 are input from the instruction selection circuit 7.

The operation of the microprocessor control apparatus according to the present invention is explained in detail below.

As shown in FIG. 5, the instructions which are read from the instruction memory 9 are sent to the instruction decode unit 2 through the instruction buffer (IBUF) 11. In this case, it is assumed that two instructions can be read from the memory 9 for every one cock cycle. The instruction decode unit 2 decodes the instructions. The entry update control circuit 5a reads the "e"-bit from each register 5-1 to 5-4. When the circuit 5a detects the vacant register of the "e"-bit, the operating instructions are moved in order of the program, and inputs the operating instructions into the register which became vacant.

Figure 9:
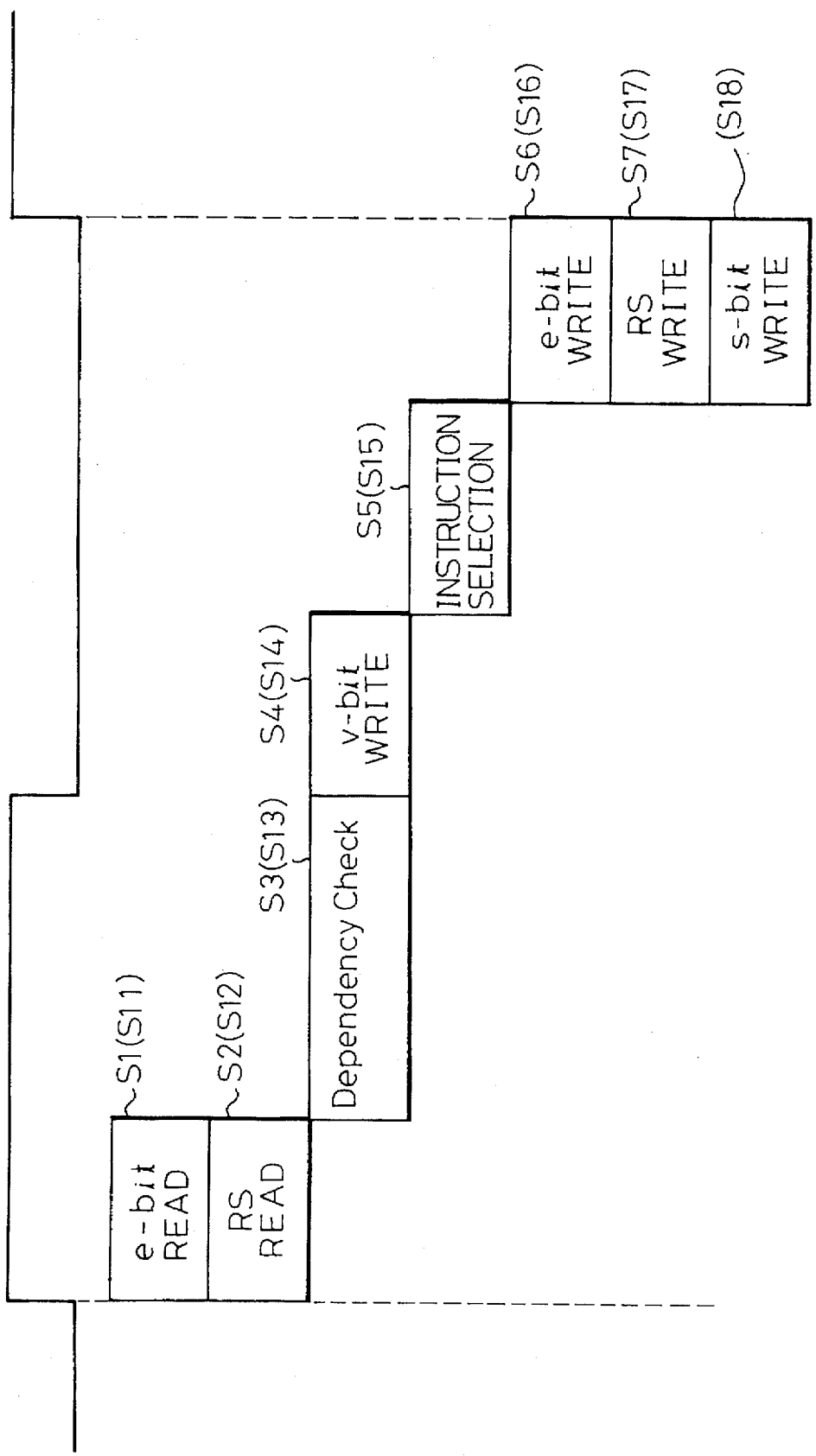
FIG. 9 is a signal timing chart according to the first and second embodiments.

FIG. 9 is a signal timing diagram and execution steps according to the first and second embodiments.

In step S1, the executability decision unit 6 reads the "e"-bit from each register 5-1 to 5-4. In step S2, the executability decision unit 6 reads the operating instruction code and the operand from the registers which are not vacant. In step S3, the executability decision unit 6 determines whether the instruction is executable (i.e., dependency check). In step S4, after this dependency check, when the operand is obtained in the operation instruction code, the operating instruction is executable. Further, the bit "1" of the "v"-bit is written into the registers 5-1 to 5-4 in which the operating instructions are held.

In step S5, it is assumed that the instructions which are held in the registers 5-2 and 5-4 are executable, i.e., there are fewer than two executable operation instructions, two operating instructions and operands are selected by the instruction selection circuit 7 in spite of the position of the operation instructions which are held in order of the program, and issues them to the operation units 1-1 and 1-2.

On the other hand, when more operating instructions than the predetermined number are executable, since only two operation units 1-1 and 1-2 are provided, it is necessary to select two instructions in order of the transfer (i.e., in order of the program) from four executable instructions, and send the two selected instructions to the operation units 1-1 and 1-2. In this case, the instruction selection circuit 7 selects the operating instructions and the operand which are held in the registers 5-2 and 5-3 in accordance with the holding position of the instructions in order of the program, and sends the selected instructions to the operation units 1-1 and 1-2.

The selection of the executable instructions can be realized by the simple circuit shown in FIG. 7. This is because the instructions are held in order of the program of the registers R3, R2, R1 and R0, and each register holds the "v"-bit indicating the executability.

If it is assumed that the instructions stored in the registers R1 and R3 are selected, in this case, the entries in the registers R1 and R3 become invalid, and can store instructions from the instruction decode unit 2 in the next clock cycle.

At that time, as shown by the time chart in FIG. 9, in step S6, the "e"-bit preparation circuit 5b updates the "e"-bit after execution of the instruction in accordance with the selection signals from the entry update control circuit 5a, writes the bit "1" of the "e"-bit into the registers R1 and R3 which have the invalid entries, and can hold instructions which are supplied from the instruction decode unit 2 in the next cycle.

At this time, the instructions are stored in the registers R3, R2, R1 and R0 in order of the transfer (i.e., in order of the program) so that the content of register R2 is moved to the register R3 and the content of register R0 is moved to the register R2. As a result, the registers R0 and R1 become vacant in the next clock cycle, and a new instruction is written into the vacant register as shown by step S7. These operations are performed in the entry update control circuit 5a so as to move among registers.

Figure 11:
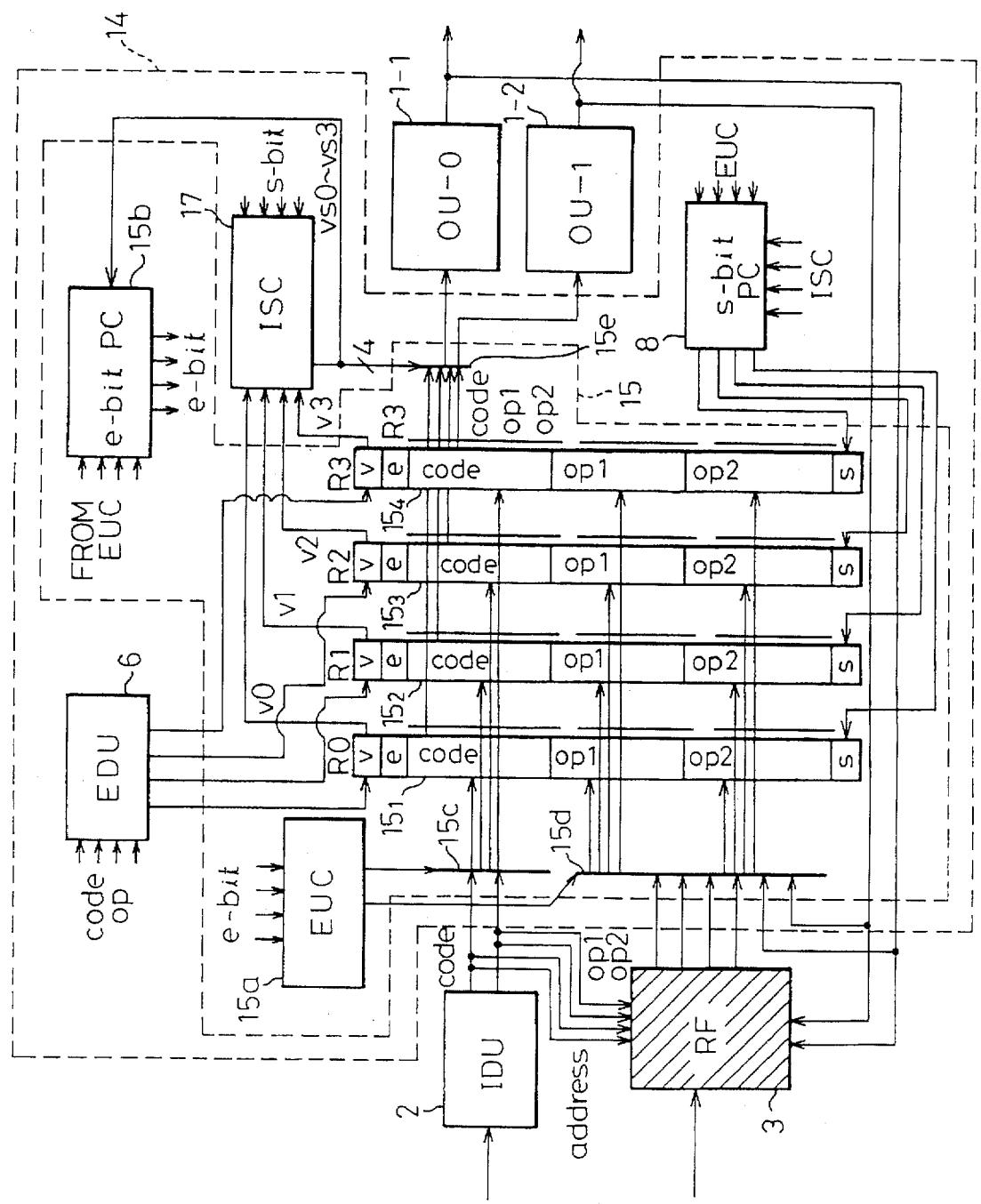
FIG. 11 is a detailed block diagram of a microprocessor control system according to a second embodiment of the present invention.

FIG. 11 is a detailed block diagram of a microprocessor control system according to a second embodiment of the present invention. In this embodiment, an instruction holding unit 15 is provided instead of the instruction/order of program holding unit 5, and the instruction selection circuit (ISC) 17 is provided instead of the instruction selection circuit 7 in the first embodiment. Further, an "s"-bit preparation circuit (s-bit PC) 8 is newly provided in correspondence to the order of program adding unit 80 (see, FIG. 4).

The instruction holding unit 15 holds the operating instructions and operands in the holding positions regardless of order of the programs. When executable instructions indicated by the "v"-bit are fewer than the predetermined number (two instructions in this embodiment), the instruction selection unit (ISC) 17 selects the instruction in spite of the "s"-bit which indicates order of the program. When the executable instructions are more than the predetermined number (two in this embodiment), the instruction selection unit 17 selects the predetermined number of instructions in accordance with the "s"-bit which is held in the instruction holding unit 15.

Figure 12:
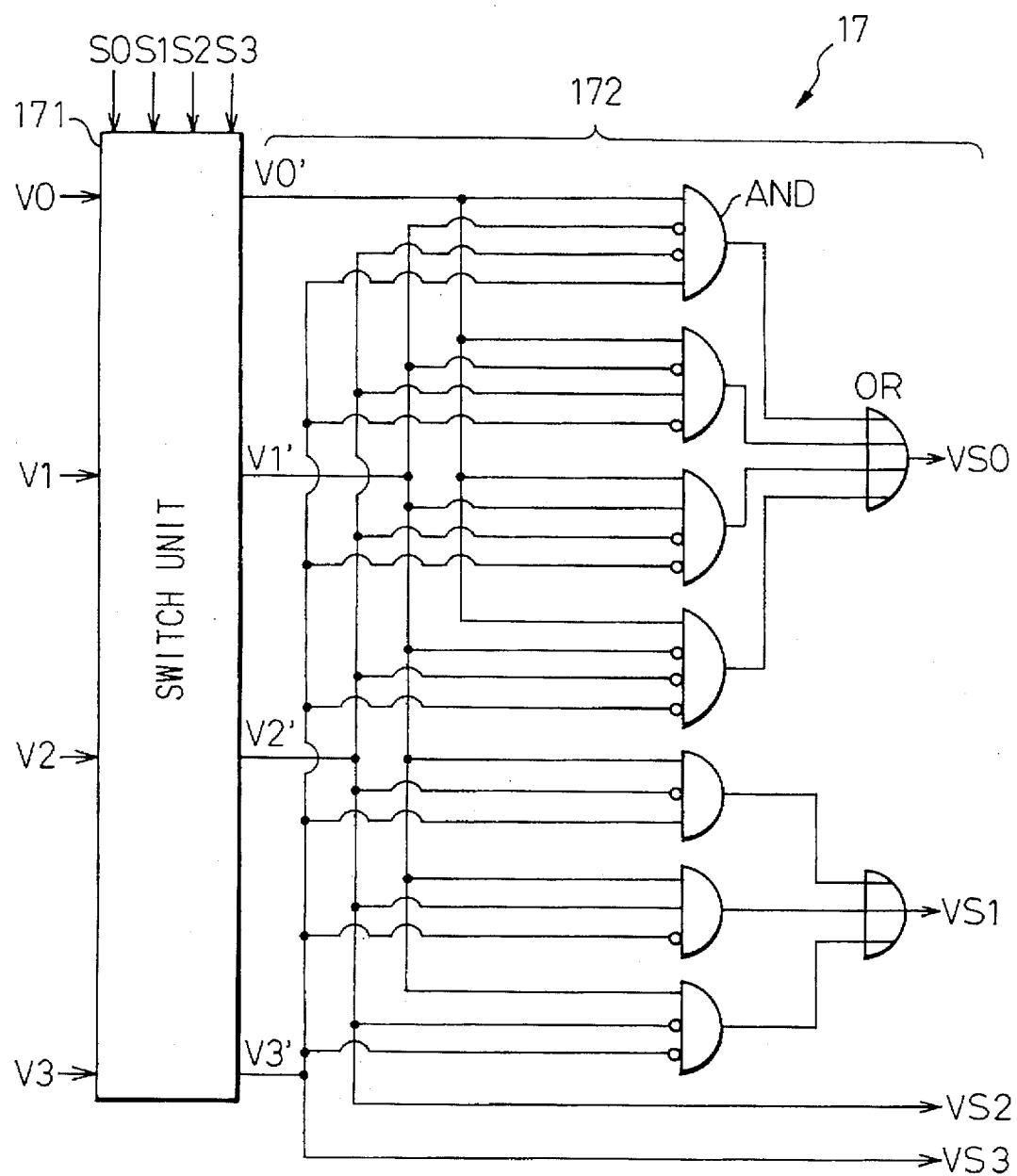
FIG. 12 is a detailed block diagram of an instruction selection circuit in FIG. 11.
Figure 13:
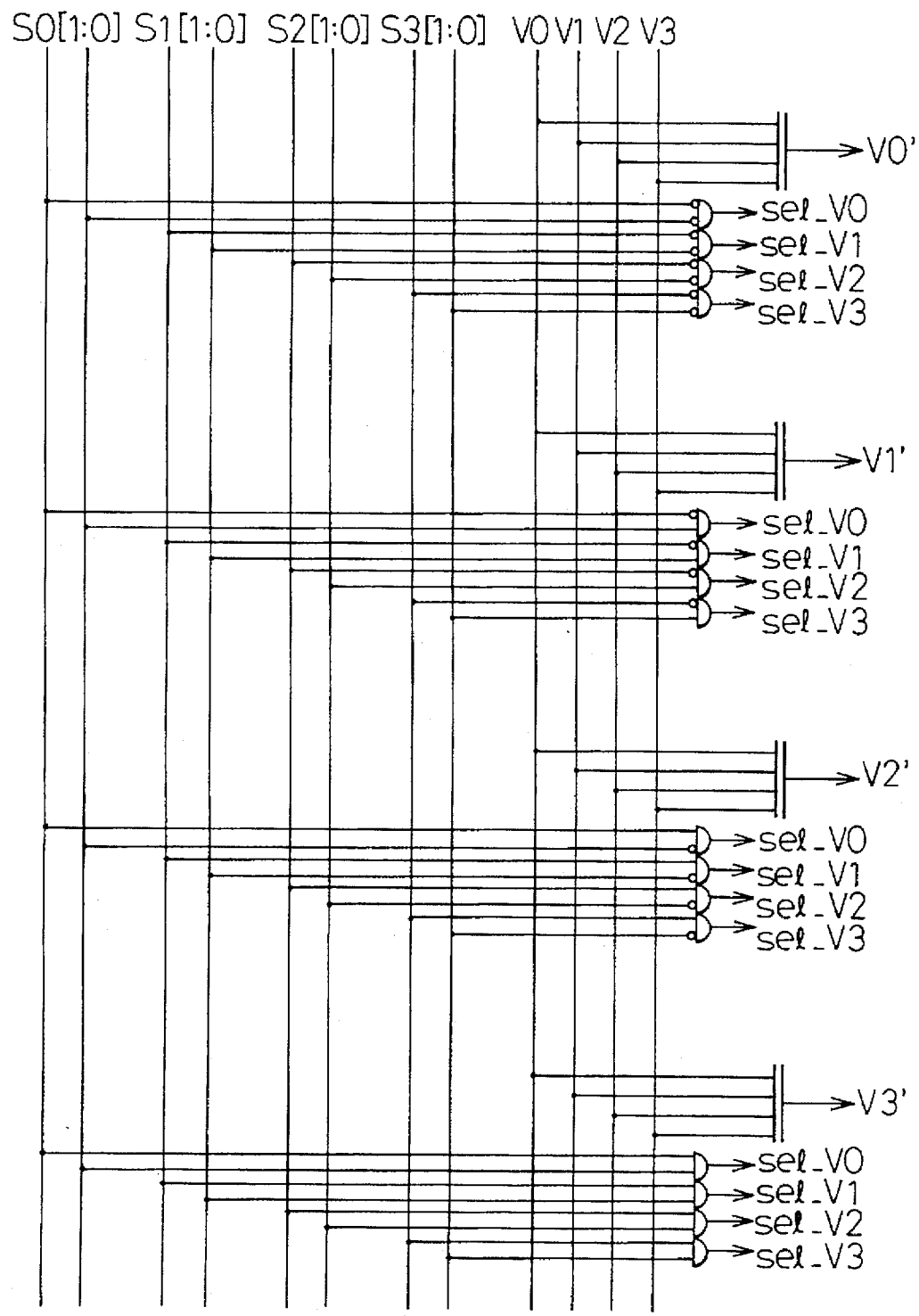
FIG. 13 is a detailed circuit of a switch unit in FIG. 12.

FIG. 12 is a detailed block diagram of an instruction selection circuit shown in FIG. 11, and FIG. 13 is a detailed circuit diagram of a switch unit shown in FIG. 12. As shown in FIG. 12, the instruction selection circuit 17 includes a switch unit 171 and a logic circuit 172. For example, the switch circuit 171 has a detailed structure as shown in FIG. 13. The logic circuit 172 is formed of seven AND gates and two OR gates. The instruction selection signals vs0 and vs1 are output from the OR gates through the AND gates, but the instruction selection signals vs2 and vs3 are directly output from the switch unit 171.

In FIG. 13, v0 to v3, v0' to v3' and s0 to s3 correspond to those of FIG. 12. This drawing shows the switch circuit which converts the v-bit to the v'-bit. In this case, the "s"-bit is formed of two bits. When the "s"-bit is "00", the v-bit becomes v0'-bit. When the "s"-bit is "01", the v-bit becomes v1'-bit. When the "s"-bit is "10", the v-bit becomes v2'-bit. When the "s"-bit is "11", the v-bit becomes v3'-bit.

Figure 14:
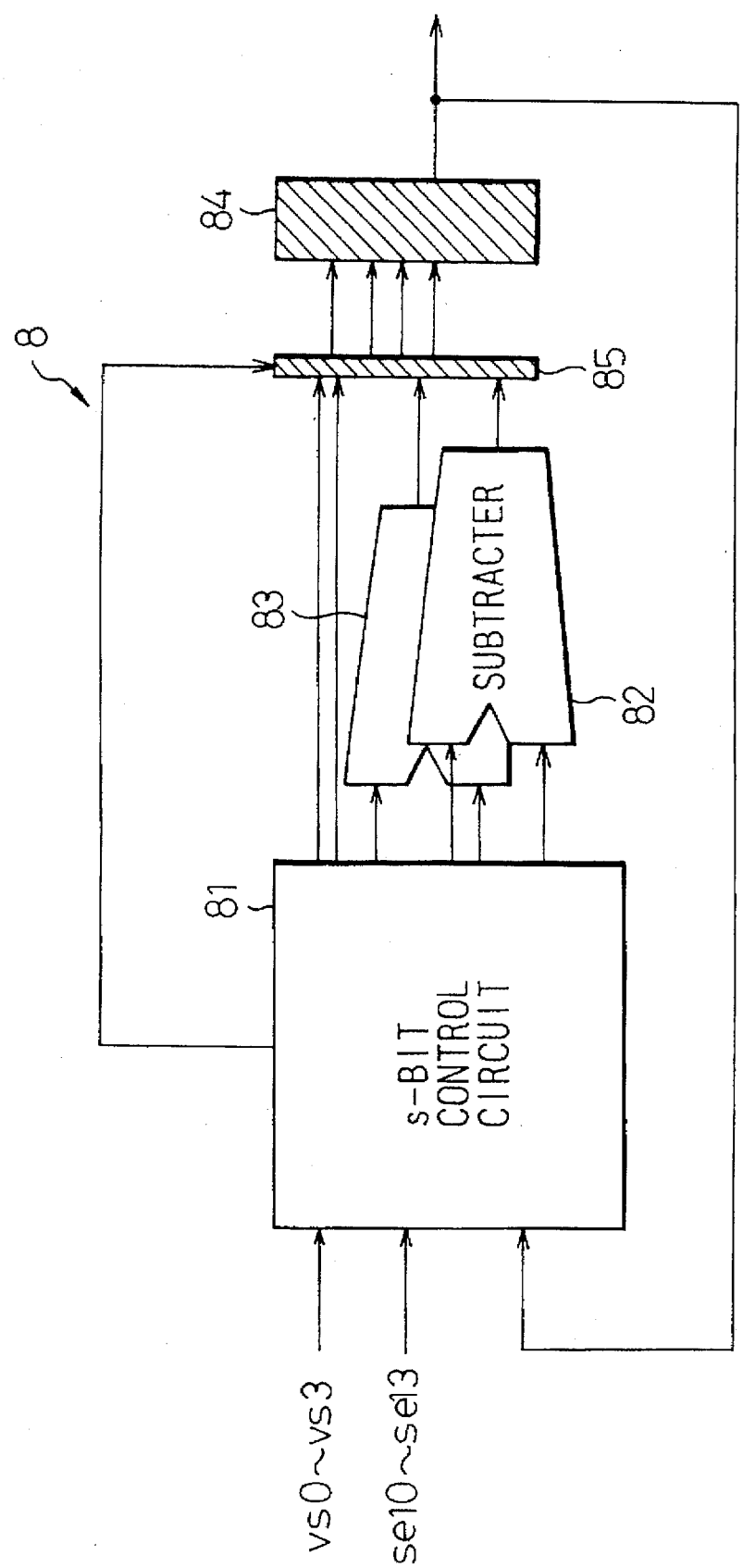
FIG. 14 is a detailed block diagram of an "s"-bit preparation circuit in FIG. 11.
Figure 15:
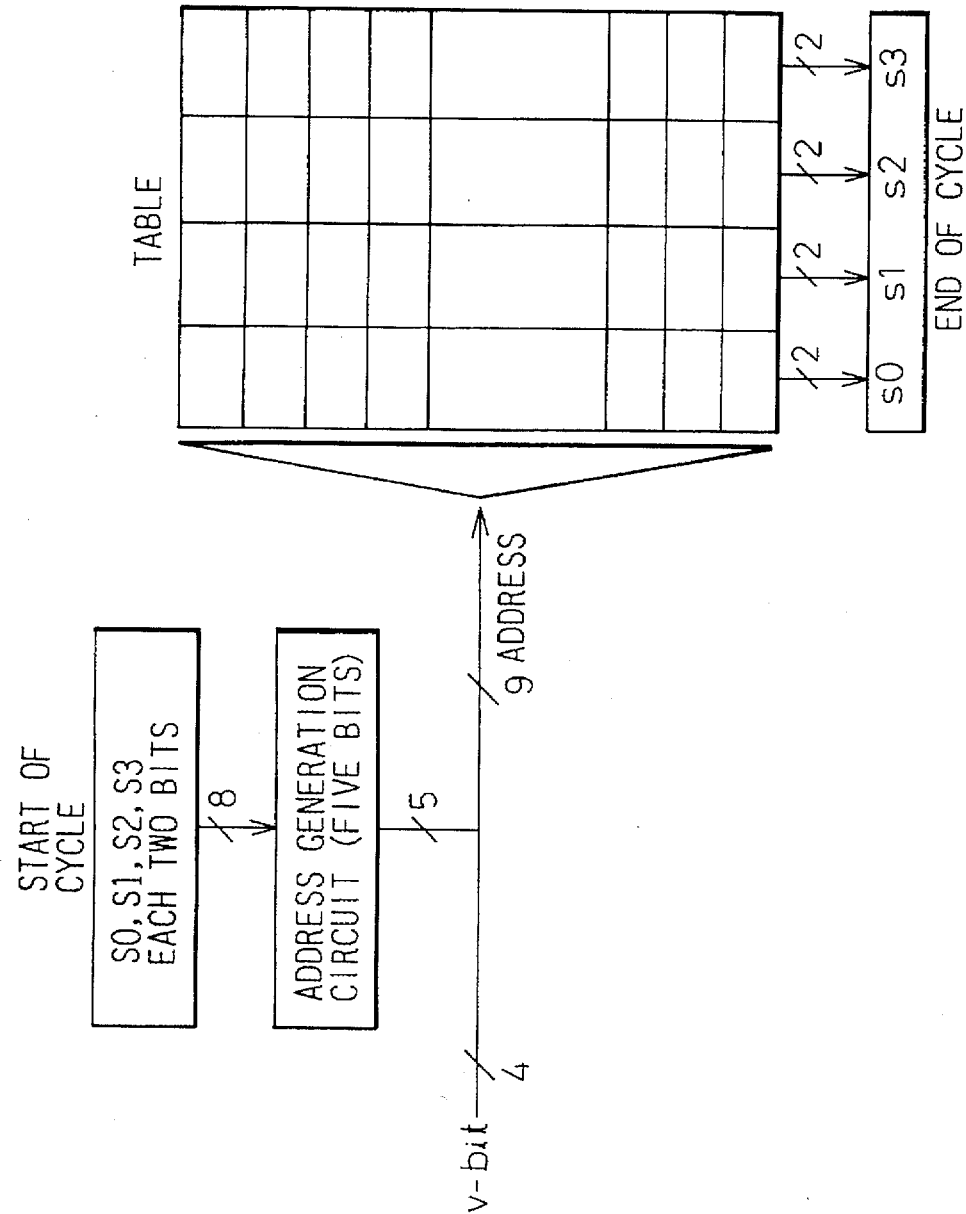
FIG. 15 is a detailed circuit of an "s"-bit control circuit in FIG. 14.

FIG. 14 is a detailed block diagram of an "s"-bit preparation circuit shown in FIG. 11, FIG. 15 is a detailed circuit of the "s"-bit control circuit shown in FIG. 14, and FIG. 16 is a table of "s"-bits and corresponding addresses.

The "s"-bit preparation circuit includes an "s"-bit control circuit 81, two subtracters 82 and 83, an arrangement unit (selector) 85, and a new "s"-bit holding unit 84.

Briefly, the "s"-bit control circuit 81 operates as follows. First, the "s"-bit control circuit 81 determines whether the instructions and operands (entries) in the reservation station 14 are executed in accordance with the instruction selection signals vs0 to vs3, and determines whether the instructions and operands are newly written into the reservation station 14 (entries) in accordance with the entry update control signals se-10 to se-13.

Based on the above data, the "s"-bit control circuit 81 selects old two bits to be subtracted, determines subtraction number (0≦subtraction number≦2), selects old two bits which are not executed and subtracted, and outputs a new "s"-bit from the output line after converting the old "s"-bit to the new "s"-bit. The subtracters 82 and 83 subtract the subtraction number from the selected old bits.

As shown in FIG. 11, when there are four entries in the instruction holding unit 15, the "s"-bit has the data width of two bits in order to indicate order of the program (1 to 4) of the operation instructions which are held in each register in the instruction holding unit 15. In this case, the "s"-bit has the order of "00", "01", "10" and "11" in order of the program. This indicates the order from a smaller address of the memory in which the programs to be read are stored. The necessity of the "s"-bit is as follows. That is, it is necessary for each register to store its own order of the program since the instructions are not moved between registers.

Next, the operation of the microprocessor control system is as follows.

The instructions read from the memory 9 are sent to the instruction decode unit 2 through the instruction buffer 11. It is assumed that two instructions are read from the memory 9 for every one clock cycle. The instruction decode unit 2 decodes the instructions. When the entry update circuit 15a reads the "s"-bit of each register 15-1 to 15-4 and detects vacant registers, the entry update circuit 15a inputs the transferred operating instructions to the vacant registers without movement of the instructions in order of the program.

As shown in FIG. 9, in step S11, the executability decision unit 6 reads the "e"-bit of each register 15-1 to 15-4. At the same time, in step S12, the decision unit 6 reads the operating instructions and operands from the registers 15-1 to 15-4. In step S13, the decision unit 6 performs the "dependency check" in order to check whether the instruction is executable. In step S14, when the operands are obtained in the operating instruction code based on this check, the decision unit 6 determines that the operating instruction is executable, sends the "v"-bit of "1" to the registers 15-1 to 15-4 which hold the operating instructions, and writes the operands.

In step S15, if the executable operating instructions are fewer than two, and if the instructions which are held in the registers 15-2 and 15-4 are executable, two operating instructions and operands are selected by the instruction selection circuit 17 in spite of the "s"-bit, and the selected instruction and operand are sent to the operation unit 1-1 and 1-2.

On the contrary, when the operating instructions are more than the predetermined number, since there are two operation units, it is necessary to select two instructions in order of the transfer from four executable instructions and to send the two selected instructions to the operation units 1-1 and 1-2. In this case, the instruction selection circuit 17 selects the operating instructions and operands in order of the program in accordance with the "s"-bit, and sends the selected them to the operation units 1-1 and 1-2.

That is, as shown in FIG. 12, in accordance with the "s"-bit which is set in each register, the instruction selection circuit 17 switches the "v"-bit, which is set to the instruction and operand in each register, so as to become order of the registers R3, R2, R1 and R0 by using the switch unit 171, and outputs instruction selection signals vs0 to vs3 through the logic element group 172.

It is assumed that the instructions stored in the registers R1 and R3 are selected. In this case, the entries of the registers R1 and R3 become invalid, it is possible to store the instructions supplied from the instruction decode unit 12 in the next cycle.

As shown in FIG. 9, in step S16, at that time, the "e"-bit preparation circuit 15b updates the "e"-bit after execution of the instruction in accordance with the selection signals from the entry update control circuit 15a, and writes the "e"-bit of "1" to the registers R1 and R3 which are invalid. In step S17, the registers R1 and R3 hold the instructions supplied from the instruction decode unit 2.

In the second embodiment, the instructions and operands are not moved between the registers, unlike the first embodiment, the new transferred instructions are stored in the registers in which the "e"-bit of "1" is written. Further, in step S18, the "s"-bit is prepared in the "s"-bit preparation circuit 8, and the instructions are stored in each register in order of transfer of the instruction.

FIG. 15 is a detailed circuit of an "s"-bit control circuit in FIG. 14, and FIG. 16 is a table of the "s"-bit and corresponding address shown in FIG. 15. In FIG. 15, the table is provided in a ROM. Basically, based on the "s"-bit and the "v"-bit at the start cycle, the "s"-bit is read from the table at the end of the cycle. Five bits address correspond to the address of FIG. 16.

The operation of the "s"-bit preparation circuit 8 is explained in detail below. When the instruction and operand of the register are sent to the operation unit in any clock cycle, and a new instruction is written into the register of the reservation station RS14, the "s"-bit preparation circuit 8 updates the "s"-bit.

Whether the instructions of the RS14 are executed is determined based on the output signals vs0 to vs3 from the instruction update control circuit 15a. Further, whether the entries are newly written into the registers of the RS14 is determined based on the update control signals se-10 to se-13 from the entry update control circuit 15a.

FIGS. 17A to 19E are explanatory views of the relationship among the RS number (RS. No) and the "s"-bit, "v"-bit and "e"-bit in order to explain the state of the "s"-bit. In all of the drawings, the left table denotes the start of the clock cycle, and the right table denotes the end of the clock cycle.

The following explanations are given of FIG. 17A as one example. In the start of the clock cycle, since all "v"-bits are "1", four entries RS0 to RS3 (RS. No) are set to the executable state in the just before one clock cycle. This means that two instructions, which are held in the corresponding registers R2 and R3 in order from the smaller "s"-bits (i.e., "00" and "01"), are executed. As a result, the entries of the registers, which hold the executed instructions, become invalid, and the "e"-bits become "1". Further, the entries of the registers can hold instructions supplied from the instruction decode unit 2 in the next clock cycle.

At the end of the clock cycle, for the instructions held in the registers R0 and R1 which are not executed, the "s"-bits "00" and "01" are set to the registers R0 and R1 as the new "s"-bits since these bits become first in order of the program. The instruction is set to the executable state (i.e., the "v"-bit is "1"), and executed in order of the programs in the end of the cycle. Further, this instruction becomes invalid after the "e"-bit is set to "1".

At that time, in the start of clock cycle, the "e"-bits become "1" in the registers R2 and R3 which hold two instructions executed, and the "s"-bits become invalid. At the end of the clock cycle, two instructions are written into the registers R2 and R3. In the registers R2 and R3 which hold the instructions, in accordance with order of the program of the instruction, the "s"-bits "10" and "11" are set. Since the executability of the instruction is not determined by means of the executability decision unit 6, the "v"-bits are shown by mark "?". Further, at the end of the cycle, since two instructions are not executed, the "e"-bits are set to "0".

The operations of the "s"-bit preparation circuit are explained in detail below with reference to FIG. 17A.

The "s"-bit control circuit 81 in the "s"-bit preparation circuit 8 detects the output signals vs0 to vs3 of the instruction selection circuit 17 at the start of the clock cycle, and determines that the instructions of the registers R2 and R3 are executed. Further, the "s"-bit control circuit 81 supplies the old "s"-bits "10" and "11" to the subtracters 82 and 83, determines the subtraction "10" (i.e., decimal number "2") and supplies this value to the subtracters 82 and 83.

Accordingly, the following result can be obtained by the subtracters 82 and 83.

11−10=01
10−10=00

Further, the "s"-bit control circuit 81 determines that the instructions are newly written into the registers R2 and R3 in accordance with the entry update control signals se-10 to se-13 at the end of the clock cycle, and outputs the new "s"-bits "10" and "11" to the register in which the instruction is written, in order of the program not through the subtracters 82 and 83.

The arrangement unit 85 arranges the result "00" and "01" of the subtraction (subtract the subtraction "2" from the old "s"-bit in the subtracters 82 and 83) and the new "s"-bits "10" and "11" in accordance with the arrangement of the corresponding register. Further, the arrangement unit 85 sends the new "s"-bits "00", "01", "10" and "11" to the corresponding register.

In the drawings, three of the four "v"-bits are "1", i.e., three entries are set to the executable state in FIGS. 17B to 17E. Further, two of the four "v"-bits are "1", i.e., two entries are set to the executable state in FIGS. 18A to 18E and 19A. Still further, one of the four "v"-bits is "1", i.e., one entry is set to the executable state in FIGS. 19B to 19E.

As explained above, in the second embodiment, the structure of the instruction holding unit 15 is simplified. This is because the instructions and operands are held in the registers in order of the program, and the orders of the program are expressed by the "s"-bit without movement of the instructions and operands. Accordingly, the positions of the instructions and operands, which are initially held in the registers, are not changed in the second embodiment. As a result, it is not necessary to provide the input selector in each register so that the entry update control circuit is simplified.

As explained above, since the entries cannot be moved in the structure using the "s"-bit, it is possible to provide the same functions as the first embodiment based on less hardware. In the second embodiment, it is possible to provide the same instruction selection circuit as the first embodiment.

If it is necessary to make the order of the program coincide with the order of execution of the operation and write of the result, it may be necessary to provide an apparatus having functions for executing above in accordance with the order of the program.

Although the above example shows the case of four registers and two operands in the instruction/order of program holding unit 5 and the instruction holding unit 15, it is possible to provide more or less registers and operands.

As explained above, according to the present invention, in the microprocessor control system enabling execution of a plurality of instructions for every one clock cycle, the processor can simultaneously execute a predetermined number (m) of the instructions by means of the instruction reservation unit. When fewer instructions than the predetermined number are transferred, the processor executes the instructions in the order of the instructions which have been set to the executable state in spite of order of the programs. On the other hand, when a number "n" of instructions (n>m) are simultaneously set to the executable state in one clock cycle, the processor starts to execute the instructions for the predetermined number which are selected in order of the programs from the number "n" of the instructions. Accordingly, it is possible to achieve execution of the instructions at a high speed and high efficiency.

I claim:

1. A microprocessor control system holding unit comprising:

an instruction memory for storing operating instructions having operands;

a data memory for holding data;

an instruction decode means coupled to the instruction memory for decoding the operating instructions;

an operand holding means coupled to the data memory for receiving data and operands of the operating instructions transferred from the instruction decode means;

a plurality of operation means coupled to the operand holding means for executing the operating instructions, and enabling execution of a predetermined number of the operating instructions for every one clock cycle; and an instruction reservation means comprising:

an instruction holding unit connected to the instruction decode means and the operand holding means for holding the operating instructions and operands in program order;

an executability decision unit connected to the instruction holding unit for determining whether the transferred operating instructions are executable, and adding an indication of the executable state of each operating instruction to each operating instruction;

an instruction selection unit connected to the instruction holding unit for selecting the operating instructions and operands based on the executable state of the operating instructions and operands when the number of executable operating instructions transferred is less than said predetermined number of operating instructions, for selecting the predetermined number of the operating instructions and operands based on program order in accordance with a holding position in the instruction holding unit when the number of executable operating instructions transferred is more than said predetermined number of operating instructions, and for issuing the selected operating instructions and operands to the plurality of operation means; and wherein said instruction holding unit comprises:

an entry update control circuit for receiving "e"-bits and generating selection signals, wherein the "e"-bits indicating whether the instruction is held in said instruction holding unit;

an "e"-bit preparation circuit for sending "e"-bits to the entry update control circuit;

a plurality of registers, each register having a "v"-bit area, and "e"-bit area, an instruction code area, and operand areas, the "v"-bit area receiving "v"-bits from the executability decision unit, the "v"-bits indicative of the executability of an instruction, the "e"-bit area receiving "e"-bits from the "e'"-bit preparation circuit, and the instruction and operand areas receiving instructions and operands and, the "v"-bit area outputting a "v"-bit to the instruction selection unit; and a plurality of selectors, each selector provided for the registers for selecting the instructions and operands from the instruction decode means in accordance with the selection signals.

2. A microprocessor control system as claimed in claim 1, wherein said instruction selection unit comprises a plurality of said AND gates and a plurality of OR gates, each of AND gates receiving first "v"-bits, each of OR gates receiving outputs of AND gates, and second "v"-bits being directly output therefrom.

3. A microprocessor control system as claimed in claim 1, wherein said "e"-bit preparation circuit comprises a plurality of sets, each set having one AND gate receiving the selection signals, and one OR gate receiving output signals from the instruction selection unit and outputting "e"-bits.

4. A microprocessor control system as claimed in claim 1, wherein said executability decision unit comprises a plurality of comparators for comparing an instruction code with the state of a register, and an OR gate for outputting a "v"-bit.

5. A microprocessor control system comprising:

an instruction memory for storing operating instructions having operands;

a data memory for holding data;

an instruction decode means coupled to the instruction memory for decoding the operating instructions;

an operand holding means coupled to the data memory for receiving data and operands of the operating instructions transferred from the instruction decode means;

a plurality of operation means coupled to the operand holding means for executing the operating instructions, and enabling execution of a predetermined number of the operating instructions for every one clock cycle; and an instruction reservation means comprising:

an instruction holding unit connected to the instruction decode means and the operand holding means for holding the operating instructions and operands;

an order of program adding unit connected to the instruction holding unit for adding the program order, which indicates the transferred operating instructions, into the operating instructions which are held in the instruction holding unit;

an executability decision unit connected to the instruction holding unit for determining whether the transferred operating instructions are executable, and adding an indication of the executable state of each operating instruction to each operating instruction held in the instruction holding unit;

an instruction selection unit connected to the instruction holding unit for selecting the operating instructions and operands based on the executable state of the operating instructions and operands when the number of executable operating instructions transferred is fewer than said predetermined number of operating instructions, for selecting the predetermined number of the operating instructions and operands based on program order when the number of executable operating instructions transferred is more than said predetermined number of operating instructions, and for issuing the selected operating instructions and operands to the operation means; and wherein the said instruction holding unit is provided with an "s"-bit preparation circuit for receiving the selection of the instruction selection unit, and sending "s"-bits, indicative of an order of the program, to a plurality of registers.

6. A microprocessor control system as claimed in claim 5, wherein each of said registers further comprises an "s"-bit area to receive the "s"-bits from the "s"-bit preparation circuit.

7. A microprocessor control system as claimed in claim 5 wherein said instruction selection unit further comprises a switch unit for receiving "s"-bits.

8. A microprocessor control system as claimed in claim 7, wherein said switch unit comprises a plurality of sets of AND gates corresponding to "s"-bits.

* * * * *